US008239650B2

(12) United States Patent
Rofougaran et al.

(10) Patent No.: US 8,239,650 B2
(45) Date of Patent: Aug. 7, 2012

(54) WIRELESSLY CONFIGURABLE MEMORY DEVICE ADDRESSING

(75) Inventors: Ahmadreza (Reza) Rofougaran, Newport Coast, CA (US); Timothy W. Markison, Lahaina, HI (US)

(73) Assignee: Broadcom Corporation, Irvine, CA (US)

( * ) Notice: Subject to any disclaimer, the term of this patent is extended or adjusted under 35 U.S.C. 154(b) by 927 days.

(21) Appl. No.: 12/236,294

(22) Filed: Sep. 23, 2008

(65) Prior Publication Data
US 2009/0019250 A1    Jan. 15, 2009

Related U.S. Application Data

(63) Continuation-in-part of application No. 12/026,681, filed on Feb. 6, 2008, and a continuation-in-part of application No. 11/700,285, filed on Jan. 31, 2007, now Pat. No. 8,116,294, and a continuation-in-part of application No. 11/888,068, filed on Jul. 31, 2007, now Pat. No. 8,010,735, and a continuation-in-part of application No. 12/202,260, filed on Aug. 30, 2008, now Pat. No. 8,175,108.

(51) Int. Cl.
  *G06F 12/00* (2006.01)
(52) U.S. Cl. ............... 711/170; 711/5; 711/E12.084
(58) Field of Classification Search ............... 711/170, 711/E12.084
See application file for complete search history.

(56) References Cited

U.S. PATENT DOCUMENTS

| 4,807,183 | A | 2/1989 | Kung |
| 5,502,683 | A | 3/1996 | Marchioro |
| 5,754,948 | A | 5/1998 | Metze |
| 5,786,912 | A | 7/1998 | Kartalopoulos |
| 5,809,321 | A | 9/1998 | Hansen |
| 5,884,104 | A | 3/1999 | Chase |
| 6,182,203 | B1 | 1/2001 | Simar |
| 6,234,900 | B1 | 5/2001 | Cumbers |
| 6,438,622 | B1 | 8/2002 | Haghighi et al. |
| 6,500,070 | B1 | 12/2002 | Tomizawa et al. |
| 6,505,305 | B1 * | 1/2003 | Olarig ................ 714/5.11 |

(Continued)

FOREIGN PATENT DOCUMENTS
EP    1499070 A2    1/2005
(Continued)

OTHER PUBLICATIONS

Bruce K Gale, "RF, Electrical, and Magnetic Microsystems," date unknown, 8 pages, Apr. 18, 2003.

(Continued)

*Primary Examiner* — Jared Rutz
*Assistant Examiner* — Larry Mackall
(74) *Attorney, Agent, or Firm* — Garlick & Markison; Timothy W. Markison; Jessica W. Smith

(57) ABSTRACT

A memory device includes a plurality of memory modules and a memory management module. A memory module of the plurality of memory modules includes a plurality of memory cells and a memory millimeter wave (MMW) transceiver. The memory management module determines a main memory configuration for at least some of the plurality of memory modules. The memory management module also determines physical addresses for the main memory configuration and determines a MMW communication resource table that includes an allocation mapping of one or more MMW communication resources to one or more of the at least some of the plurality of memory modules.

22 Claims, 12 Drawing Sheets

U.S. PATENT DOCUMENTS

| | | | |
|---|---|---|---|
| 6,663,295 B2 | 12/2003 | Kami et al. |
| 6,735,663 B2 | 5/2004 | Watts, Jr. et al. |
| 6,735,708 B2 | 5/2004 | Watts, Jr. |
| 6,801,974 B1 | 10/2004 | Watts, Jr. et al. |
| 6,816,925 B2 | 11/2004 | Watts, Jr. |
| 7,065,326 B2 | 6/2006 | Lovberg |
| 7,082,285 B2 | 7/2006 | Linde |
| 7,149,837 B2 | 12/2006 | Watts, Jr. et al. |
| 7,159,099 B2 | 1/2007 | Lucas |
| 7,171,050 B2 | 1/2007 | Kim |
| 7,197,584 B2 | 3/2007 | Huber et al. |
| 7,218,143 B1 | 5/2007 | Young |
| 7,257,093 B1 | 8/2007 | Witzke |
| 7,330,702 B2 | 2/2008 | Chen et al. |
| 7,406,062 B2 | 7/2008 | Hsu |
| 7,444,393 B2 | 10/2008 | Chung |
| 7,903,724 B2 | 3/2011 | Rofougaran |
| 7,929,474 B2 | 4/2011 | Pettus |
| 2002/0022521 A1 | 2/2002 | Idaka |
| 2002/0049806 A1 | 4/2002 | Gatz et al. |
| 2002/0061012 A1 | 5/2002 | Thi |
| 2002/0107010 A1 | 8/2002 | Witte |
| 2002/0164945 A1 | 11/2002 | Olsen |
| 2003/0001882 A1 | 1/2003 | Macer et al. |
| 2003/0017845 A1 | 1/2003 | Doviak |
| 2003/0023828 A1* | 1/2003 | March et al. ............ 711/173 |
| 2003/0040284 A1 | 2/2003 | Sato |
| 2003/0059022 A1 | 3/2003 | Nebiker |
| 2003/0078071 A1 | 4/2003 | Uchimyama |
| 2003/0112585 A1 | 6/2003 | Silvester |
| 2003/0126335 A1 | 7/2003 | Silvester |
| 2003/0128712 A1 | 7/2003 | Moriwaki |
| 2003/0162503 A1 | 8/2003 | LeCren |
| 2003/0172380 A1 | 9/2003 | Kikinis |
| 2003/0221036 A1 | 11/2003 | Konetski |
| 2004/0054776 A1 | 3/2004 | Klotz |
| 2004/0062308 A1 | 4/2004 | Kamosa |
| 2004/0117442 A1 | 6/2004 | Thielen |
| 2004/0123113 A1 | 6/2004 | Mathiassen et al. |
| 2004/0153863 A1 | 8/2004 | Klotz |
| 2004/0157559 A1 | 8/2004 | Sugikawa |
| 2004/0174431 A1 | 9/2004 | Stienstra |
| 2004/0203364 A1 | 10/2004 | Silvester |
| 2004/0266336 A1 | 12/2004 | Patsiokas et al. |
| 2005/0014468 A1 | 1/2005 | Salokannel |
| 2005/0060598 A1 | 3/2005 | Klotz |
| 2005/0124307 A1 | 6/2005 | Ammar et al. |
| 2005/0185364 A1 | 8/2005 | Bell |
| 2005/0250531 A1 | 11/2005 | Takebe et al. |
| 2006/0026348 A1 | 2/2006 | Wallace |
| 2006/0038731 A1 | 2/2006 | Turner |
| 2006/0046762 A1 | 3/2006 | Yoon et al. |
| 2006/0085675 A1 | 4/2006 | Popell |
| 2006/0101164 A1 | 5/2006 | Lee |
| 2006/0148568 A1 | 7/2006 | Schultz et al. |
| 2006/0164271 A1 | 7/2006 | Hirt |
| 2006/0167784 A1 | 7/2006 | Hoffberg |
| 2006/0176851 A1 | 8/2006 | Bennett |
| 2006/0190691 A1 | 8/2006 | Chauve |
| 2006/0203758 A1 | 9/2006 | Tee et al. |
| 2006/0252470 A1 | 11/2006 | Seshadri |
| 2006/0260546 A1 | 11/2006 | Usami |
| 2006/0262026 A1 | 11/2006 | Gainey et al. |
| 2006/0269004 A1 | 11/2006 | Ibrahim |
| 2006/0282635 A1 | 12/2006 | Mather |
| 2007/0015558 A1 | 1/2007 | Zalewski et al. |
| 2007/0038808 A1 | 2/2007 | Yim |
| 2007/0147152 A1 | 6/2007 | Sekiguchi |
| 2007/0155502 A1 | 7/2007 | Wu |
| 2007/0167149 A1 | 7/2007 | Comstock |
| 2007/0229270 A1 | 10/2007 | Rofougaran |
| 2007/0239929 A1 | 10/2007 | Chen |
| 2007/0268481 A1 | 11/2007 | Raskar et al. |
| 2007/0298882 A1 | 12/2007 | Marks et al. |
| 2008/0020843 A1 | 1/2008 | Wolinsky |
| 2008/0028118 A1 | 1/2008 | Sayers et al. |
| 2008/0040541 A1 | 2/2008 | Brockmann |
| 2008/0063236 A1 | 3/2008 | Ikenoue et al. |
| 2008/0070516 A1 | 3/2008 | Lee |
| 2008/0076406 A1 | 3/2008 | Chen |
| 2008/0151847 A1 | 6/2008 | Abujbara |
| 2008/0244148 A1 | 10/2008 | Nix et al. |
| 2009/0006640 A1 | 1/2009 | Brouwer |
| 2009/0198854 A1 | 8/2009 | Rofougaran |
| 2009/0215533 A1 | 8/2009 | Zalewski et al. |
| 2010/0056132 A1 | 3/2010 | Gallagher |
| 2010/0120447 A1 | 5/2010 | Anderson et al. |
| 2010/0146199 A1 | 6/2010 | Shaeffer |
| 2010/0273468 A1 | 10/2010 | Bienas et al. |
| 2011/0134868 A1 | 6/2011 | Lee et al. |

FOREIGN PATENT DOCUMENTS

WO 2009002464 A2 12/2008

OTHER PUBLICATIONS

Dr. Lynn Fuller, "Microelectromechanical Systems (MEMs) Applications—Microphones,"Rochester Institute of Technology Microelectronic Engineering, Apr. 25, 2005, pp. 1-43.

Radio Control Adapter; IBM Technical Disclosure Bulletin NN86081337; IBM; Aug. 1986.

Xilinx Inc.: Spartan-3AN FPGA Family Data Sheet, DS557, Jun. 2, 2008, p. 5.

Haworth, et al.; Public Security Screening for Metallic Objects with Millimetre-Wave Images; Heriot-Watt University; United Kingdom; pp. 1-4, Oct. 10, 2005.

Elsadek, et al.; "A Compact 3-D Microwave Holographic Pointer System Using a Size Reduced Microstrip Planar Array"; Department of Electrical and Computer Engineering; University of California; pp. 1-5, Aug. 6, 2002.

Elsadek, et al.; "Microstrip Multi-element Diversity Antenna Array for Three Dimensional Microwave Holographic Input Pointer (Holo3D)"; Department of Electrical and Computer Engineering; University of California; pp. 1-4, Aug. 7, 2002.

E3 Wii Controller; Nintendo Wilmote; Technology Limitations; Xgaming, Inc.; pp. 1-5, May 28, 2005.

* cited by examiner

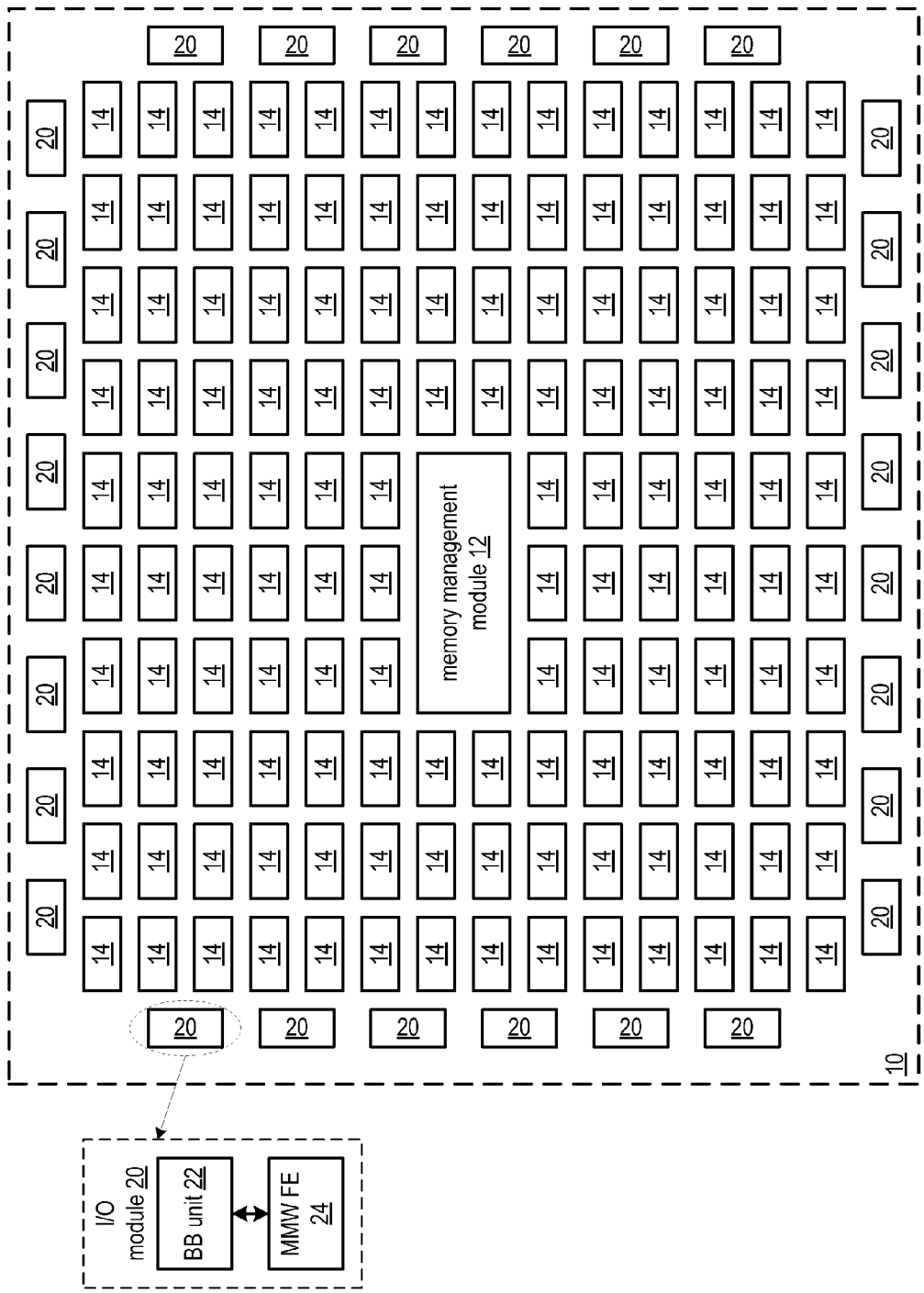

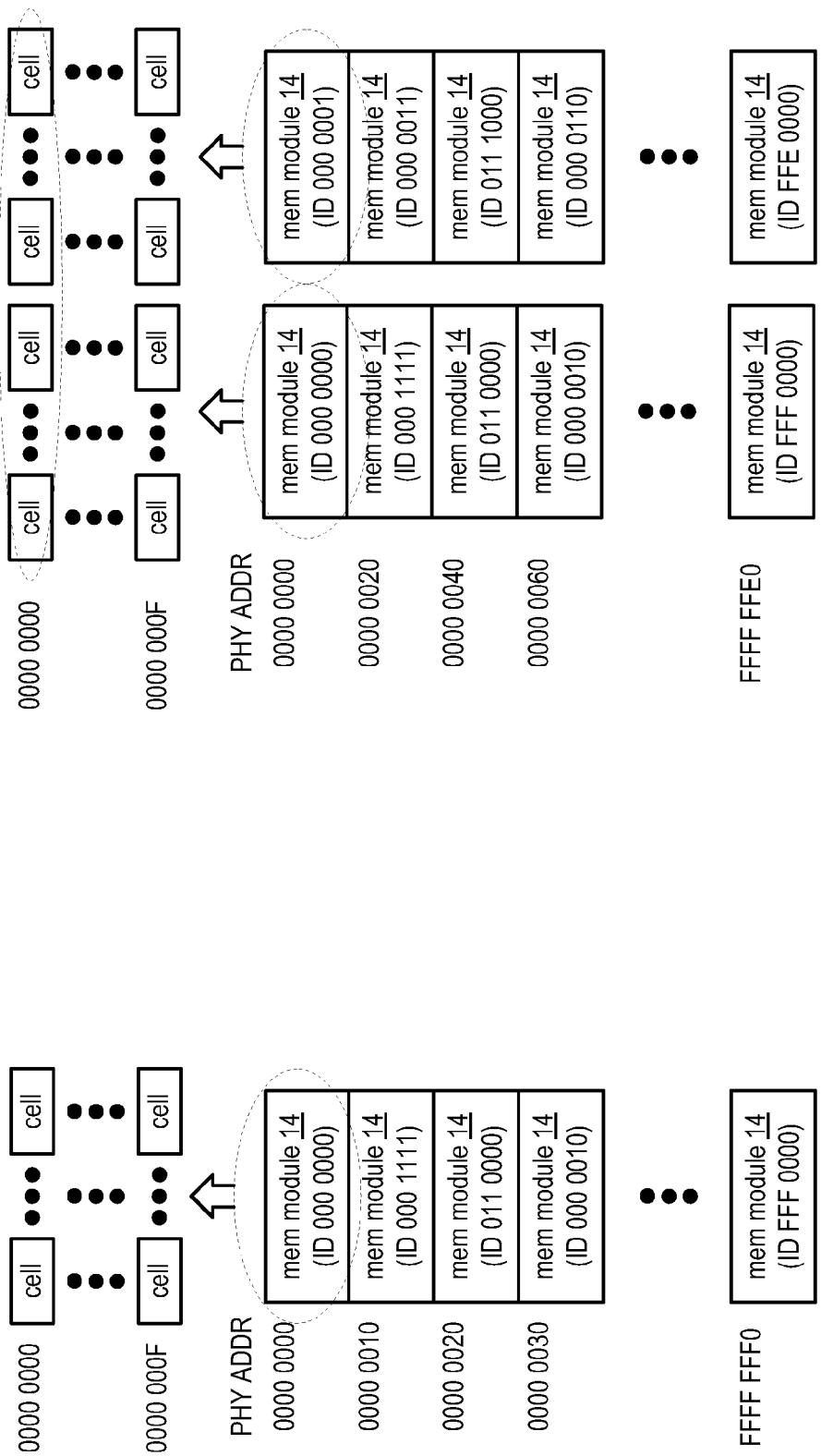

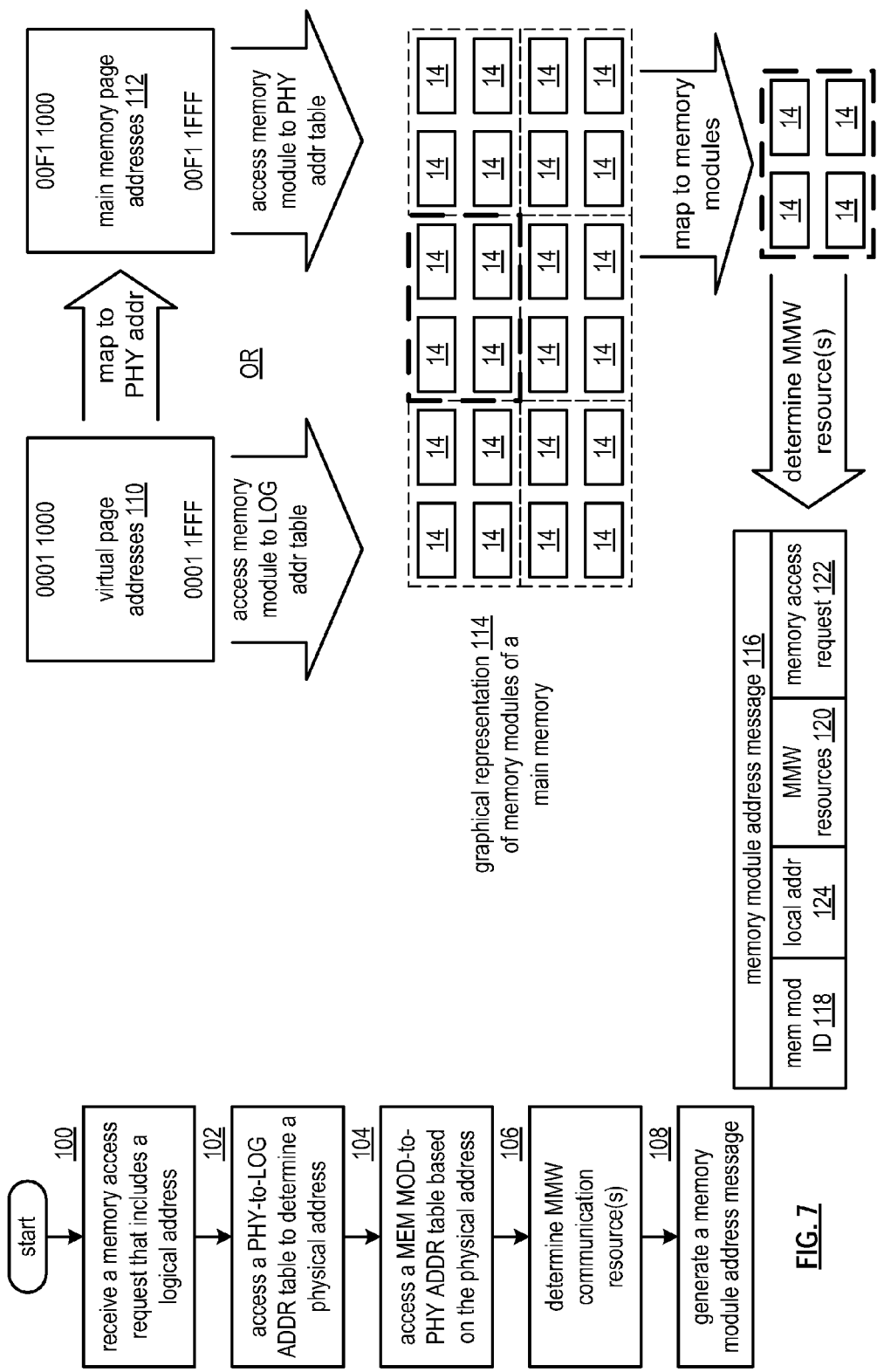

WIRELESSLY CONFIGURABLE MEMORY DEVICE ADDRESSING

This patent application is claiming priority under 35 USC §120 as a continuation in part patent application of co-pending patent applications:

1. entitled COMPUTING DEVICE WITH HANDHELD AND EXTENDED COMPUTING UNITS, having a filing date of Feb. 6, 2008, and a Ser. No. 12/026,681;
2. RF BUS CONTROLLER, having a filing date of Jan. 31, 2007, and a Ser. No. 11/700,285, issued on Feb. 14, 2012 as U.S. Pat. No. 8,116,294;
3. entitled FLASH MEMORY WITH MILLIMETER WAVE HOST INTERFACE AND METHOD FOR USE THEREWITH, having a filing date of Jul. 31, 2007, and a Ser. No. 11/888,068, issued on Aug. 30, 2011 as U.S. Pat. No. 8,010,735; and
4. entitled WIRELESSLY CONFIGURABLE MEMORY DEVICE, having a filing date of Aug. 30, 2008, and a Ser. No. 12/202,260, issued on May 8, 2012 as U.S. Pat. No. 8,175,108.

STATEMENT REGARDING FEDERALLY SPONSORED RESEARCH OR DEVELOPMENT

NOT APPLICABLE

INCORPORATION-BY-REFERENCE OF MATERIAL SUBMITTED ON A COMPACT DISC

NOT APPLICABLE

BACKGROUND OF THE INVENTION

1. Technical Field of the Invention

This invention relates generally to computing devices and more particularly to components of such computing devices.

2. Description of Related Art

Communication systems are known to support wireless and wire lined communications between wireless and/or wire lined communication devices. Such communication systems range from national and/or international cellular telephone systems to the Internet to point-to-point in-home wireless or wired networks. The wireless and/or wire lined communication devices may be personal computers, laptop computers, personal digital assistants (PDA), cellular telephones, personal digital video players, personal digital audio players, global positioning system (GPS) receivers, video game consoles, entertainment devices, etc.

Many of the communication devices include a similar basic architecture: that being a processing core, memory, and peripheral devices. The memory stores operating instructions that the processing core uses to generate data, which may also be stored in the memory. The peripheral devices allow a user of the communication device to direct the processing core as to which programs and hence which operating instructions to execute, to enter data, etc. and to see the resulting data. For example, a cellular telephone includes a keypad, a display, a microphone and a speaker for such functions.

The memory typically includes a hierarchy structure of cache memory, random access memory (RAM), hard disk memory, and/or flash memory since the processing core operates at a much faster rate than data can be read from, or written to, RAM, hard disks, and/or flash memory. In such a hierarchy structure, the cache memory exchanges data and/or instructions with the processing core and the RAM and the RAM exchanges the data and/or instructions with the hard disk memory and/or flash memory. Such data exchange is typically done in a serial read-write manner. To improve the data exchange, some memories may utilize a double data rate technique. While a great many advances have been made in memory technology, once the architecture of a memory device is implemented on an IC, there is little ability to reconfigure the architecture.

In addition, as integrated circuit technology advances, the basic architecture of random access memory is increasing in complexity, capabilities, and size reduction. However, communication with and/or within such memory is done using traces (e.g., on an IC and/or on a PCB), which requires drivers to drive the lines. As is known, the transferring of data via the traces and drivers consumes a significant amount of power, which produces heat, and consumes a relatively significant amount of die area.

Therefore, a need exists for a configurable memory and/or a mechanism for configuring and/or addressing the memory.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWING(S)

FIG. 2 is a schematic block diagram of another embodiment of a memory device in accordance with the present invention;

FIG. 3 is a diagram of an example of a main memory configuration in accordance with the present invention;

FIG. 4 is a diagram of another example of a main memory configuration in accordance with the present invention;

FIG. 7 is a logic diagram of an embodiment of a method for accessing a configured main memory in accordance with the present invention;

FIG. 8 is a diagram of an example of accessing a configured main memory in accordance with the present invention;

DETAILED DESCRIPTION OF THE INVENTION

Figure 1:
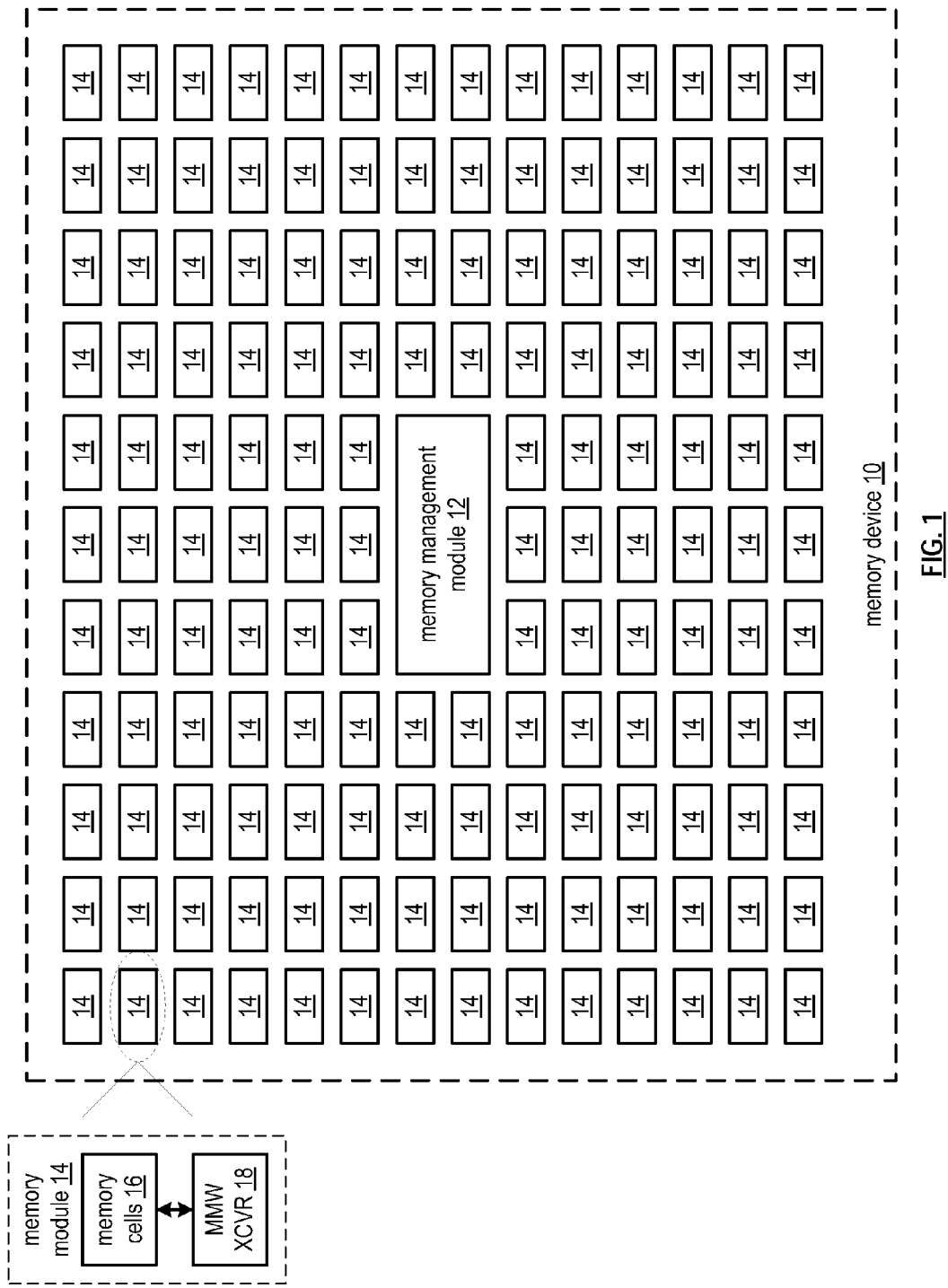
FIG. 1 is a schematic block diagram of an embodiment of a memory device in accordance with the present invention.

FIG. 1 is a schematic block diagram of an embodiment of a memory device 10 that includes a memory management module 12 and a plurality of memory modules 14. Each of the memory modules 14 includes a plurality of memory cells 16 and a millimeter wave (MMW) transceiver (XCVR) 18. The memory device 10 may be implemented on one or more dies of an integrated circuit (IC) and/or in one or more integrated circuits.

The MMW transceiver 18 includes a baseband processing module, a receiver section, and a transmitter section. The transmitter and receiver sections may share one or more antennas or each may have its own one or more antennas. The baseband processing module may include one or more processing devices, which may be a field programmable gate array, a programmable logic device, a state machine, logic circuitry, analog circuitry, digital circuitry, and/or any device that manipulates signals (analog and/or digital) based on hard coding of the circuitry and/or operational instructions.

The baseband processing module converts outbound data (e.g., a memory access response, a configuration response, etc.) into an outbound symbol stream in accordance with a data modulation scheme and a channel usage scheme. The data modulation scheme may be binary phase shift keying (BPSK), quadrature phase shift keying (QPSK), frequency shift keying (FSK), minimum shift keying (MSK), amplitude shift keying (ASK), quadrature amplitude modulation (QAM), a combination thereof, and/or variations thereof. The channel usage scheme may be time division multiple access (TDMA), frequency divisional multiple access (FDMA), code division multiple access (CDMA), orthogonal frequency division multiplexing (OFDM), a combination thereof, and/or variations thereof. In addition, the baseband processing module may also utilize a scrambling scheme, an encoding scheme, a data puncture scheme, an interleaving scheme, space-time-frequency encoding, a beamforming scheme, a frequency to time domain conversion, and/or a combination thereof to produce the outbound symbol stream.

The transmitter section converts the outbound symbol stream into an outbound RF signal that has a carrier frequency within a given frequency band (e.g., 57-66 GHz, etc.). In an embodiment, this may be done by mixing the outbound symbol stream with a local oscillation to produce an up-converted signal. One or more power amplifiers and/or power amplifier drivers amplifies the up-converted signal, which may be RF bandpass filtered, to produce the outbound RF signal. In another embodiment, the transmitter section includes an oscillator that produces an oscillation. The outbound symbol stream provides phase information (e.g., +/−Δθ [phase shift] and/or θ(t) [phase modulation]) that adjusts the phase of the oscillation to produce a phase adjusted RF signal, which is transmitted as the outbound RF signal. In another embodiment, the outbound symbol stream includes amplitude information (e.g., A(t) [amplitude modulation]), which is used to adjust the amplitude of the phase adjusted RF signal to produce the outbound RF signal.

In yet another embodiment, the transmitter section includes an oscillator that produces an oscillation. The outbound symbol provides frequency information (e.g., +/−Δf [frequency shift] and/or f(t) [frequency modulation]) that adjusts the frequency of the oscillation to produce a frequency adjusted RF signal, which is transmitted as the outbound RF signal. In another embodiment, the outbound symbol stream includes amplitude information, which is used to adjust the amplitude of the frequency adjusted RF signal to produce the outbound RF signal. In a further embodiment, the transmitter section includes an oscillator that produces an oscillation. The outbound symbol provides amplitude information (e.g., +/−ΔA [amplitude shift] and/or A(t) [amplitude modulation) that adjusts the amplitude of the oscillation to produce the outbound RF signal.

The receiver section amplifies an inbound RF signal to produce an amplified inbound RF signal. The receiver section may then mix in-phase (I) and quadrature (Q) components of the amplified inbound RF signal with in-phase and quadrature components of a local oscillation to produce a mixed I signal and a mixed Q signal. The mixed I and Q signals are combined to produce an inbound symbol stream. In this embodiment, the inbound symbol may include phase information (e.g., +/−Δθ [phase shift] and/or θ(t) [phase modulation]) and/or frequency information (e.g., +/−Δf [frequency shift] and/or f(t) [frequency modulation]). In another embodiment and/or in furtherance of the preceding embodiment, the inbound RF signal includes amplitude information (e.g., +/−ΔA [amplitude shift] and/or A(t) [amplitude modulation]). To recover the amplitude information, the receiver section includes an amplitude detector such as an envelope detector, a low pass filter, etc.

The baseband processing module converts the inbound symbol stream into inbound data (e.g., a memory access request, a configuration command, etc.) in accordance with the data modulation scheme and the channel usage scheme. In addition to demodulating the inbound symbol stream, the baseband processing module may also utilize a descrambling scheme, an decoding scheme, a data de-puncture scheme, a de-interleaving scheme, space-time-frequency decoding, a time to frequency domain conversion, and/or a combination thereof to produce the inbound data.

In operation, the memory management module 12 determines a main memory configuration for at least some of the plurality of memory modules 14. The memory management module may determine the main memory configuration by accessing a pre-programmed default configuration, accessing a look up table to determine the main memory configuration from one of a plurality of configurations, and/or by determining memory addressability (e.g., location addressable, file addressable, and/or content-addressable). Examples of configuring the memory modules 14 into main memory are provided with reference to FIGS. 3 and 4.

The memory management module 12 then determines physical addresses for the main memory configuration, which may be recorded in a physical address to memory module table. The memory management module 12 continues it functioning by determining a MMW communication resource table for the main memory configuration. The table includes an allocation mapping of one or more MMW communication resources to one or more of the at least some of the plurality of memory modules 14.

A wireless communication resource may be a channel or a slot of a channel that lies within one or more of a plurality of frequency bands (e.g., 29 GHz frequency band, the 60 GHz frequency band, and/or other higher frequency bands). Each frequency band is divided into a plurality of channels. The number of channels within a frequency band may conform to conventional channel definition schemes or customized for the memory device 10. One or more of the channels may be divided into slots or subcarriers that may be partitioned in a time division multiple access manner (e.g., TDMA), in a frequency divisional multiple access or orthogonal frequency division multiple access manner (e.g., FDMA, OFDM), and/or in a code division multiple access manner (e.g., CDMA).

FIG. 2 is a schematic block diagram of another embodiment of a memory device 10 that includes the memory management module 12, the plurality of memory modules 14, and a plurality of input/output (I/O) modules 20. Each of the I/O modules 20 includes a baseband (BB) unit 22 and a millimeter wave (MMW) front-end (FE) 24 (e.g., a transmitter section and a receiver section). The baseband unit 22 may include one or more processing devices, which may be a field programmable gate array, a programmable logic device, a state machine, logic circuitry, analog circuitry, digital circuitry, and/or any device that manipulates signals (analog and/or digital) based on hard coding of the circuitry and/or operational instructions.

In this embodiment, the memory management module 12 configures the memory modules 14 into a main memory as discussed with reference to FIG. 1, however, communication between the memory modules 14 and components (e.g., processing module, digital signal processor, microprocessor, direct memory access module, etc.) is via the I/O modules 20. In this instance, the memory management module 12 may further allocation wireless communication resources with the memory device 10 for communications between the I/O devices and the memory modules 14 and may even further allocation wireless communication resources for communications of the I/O devices 20 with the external components.

FIG. 3 is a diagram of an example of a plurality of memory modules 14 configured into a main memory. Each memory module 14 has a unique identification code (ID) and includes a plurality of cells that are arranged into x-rows and y-columns, where x is equal to or greater than 1 and y is equal to or greater than 8. A cell includes circuitry to store a bit of data, where the circuitry may be a flip-flop (e.g., for static RAM), a capacitor and/or transistor (e.g., for dynamic RAM), etc. The circuitry may also include parity bit checking and/or error correction coding functionality to detect and/or correct memory errors. Note that from group to group of memory modules 14, the number of rows (x) and the number of columns (y) may vary. For example, one group of memory modules may includes 16 rows and 16 columns of cells, while another group of memory modules includes 32 rows of 16 columns, and another group includes 8 rows of 32 columns, etc.

In the example of FIG. 3, a memory module 14 includes 16 addressable lines (e.g., 16 rows of y-columns). The number of columns may be 8 bits, 16 bits, 32 bits, 64 bits, etc. In this regard, each line within the memory module 14 has a unique physical address (PHY ADDR). For instance, the memory module 14 having a memory module identification code (ID) of 000 0000 may be assigned physical addresses of 0000 0000 to 0000 000F (in hexadecimal) of main memory; memory module 14 having the memory ID of 000 1111 may be assigned physical addresses 0000 0010 to 0000 001F; memory module 14 having the memory ID of 011 0000 may be assigned physical addresses 0000 0020 to 0000 002F, etc. The memory management module 12 records the mapping of memory modules to physical addresses in a table based on the memory module ID. Note that any memory module 14 may be mapped to any physical address within the defined space of physical addresses and such mapping may change during use of the memory device 10.

In the present example, the memory modules 14 are arranged into a 4 Giga-word (where a word corresponds to the length of the addressable line, i.e., the number of columns of cells in a memory module) main memory. Depending on the number of memory modules available, the main memory may be smaller (e.g., 1 Giga-word, 512 Mega-word, etc.), may be configured to provide multiple main memories (e.g., one for user applications, one for operating system applications, one for direct memory access (DMA), etc.), and/or a combination thereof.

FIG. 4 is a diagram of another example an example of a plurality of memory modules 14 configured into a main memory. Each memory module 14 has a unique identification code (ID) and includes a plurality of cells that are arranged into x-rows and y-columns, where x is equal to or greater than 1 and y is equal to or greater than 8. Note that from group to group of memory modules 14, the number of rows (x) and the number of columns (y) may vary. For example, one group of memory modules may includes 16 rows and 16 columns of cells, while another group of memory modules includes 32 rows of 16 columns, and another group includes 8 rows of 32 columns, etc.

In the example of FIG. 4, a memory module 14 includes 32 addressable lines (e.g., 32 rows of y-columns). The number of columns may be 8 bits, 16 bits, 32 bits, 64 bits, etc. In this instance, a unique physical address (PHY ADDR) includes the first addressable line of two memory modules such that an addressable line includes 2*y-columns of cells. For instance, the memory modules 14 having memory module IDs of 000 0000 and 000 0001 may be assigned physical addresses of 0000 0000 to 0000 001F (in hexadecimal) of main memory; memory modules 14 having the memory IDs of 000 1111 and 000 0011 may be assigned physical addresses 0000 0020 to 0000 003F; memory modules 14 having the memory IDs of 011 0000 and 011 1000 may be assigned physical addresses 0000 0040 to 0000 005F, etc. The memory management module 12 records the mapping of memory modules to physical addresses in a table based on the memory module ID. The mapping includes identifying which memory module corresponds to the most significant bits and which one corresponds to the least significant bits.

The configuration examples of FIGS. 3 and 4 are two of a variety of ways in which the memory modules may be configured to provide a main memory. For example, more than two columns of memory modules may be used to provide the main memory. Further, multiple main memories may be generated based on the word size of the application accessing the main memory. For example, if an application uses 16 bit words and another uses 32-bit words, a first main memory of 16-bit lines may be configured to support the first application and a second main memory of 32-bit lines may be configured to support the other application. In this example, the memory management module 12 determines a memory line size of memory modules 14 (e.g., the number of columns) and then determines the main memory configuration in accordance with the memory line size. Continuing with the present example, if the memory line size of a memory module is 16 bits, then the first main memory may be configured as shown in FIG. 3 and the second main memory may be configured as shown in FIG. 4.

To support the configuration of main memory and updating thereof, the memory management module 12 determines the main memory configuration at start-up a device including the memory device and during on-going operation of the device. At start-up of a device the memory management module 12 determines start-up applications (e.g., user applications, operating system applications, DMA, etc.) requiring access to main memory. The memory management module 12 then allocates a portion of the plurality of memory modules for the start-up applications and configures the portion of the plurality of memory modules in accordance with memory requirements of the start-up applications.

During on-going operation of the device, the memory management module determines active applications (e.g., new applications and at least some of the start-up applications) requiring access to main memory. The memory management module 12 then allocates the plurality of memory modules for the active applications, which may include re-allocating memory modules from inactive applications. The memory management module then configures the plurality of memory modules in accordance with memory requirements of the active applications.

Figure 5:
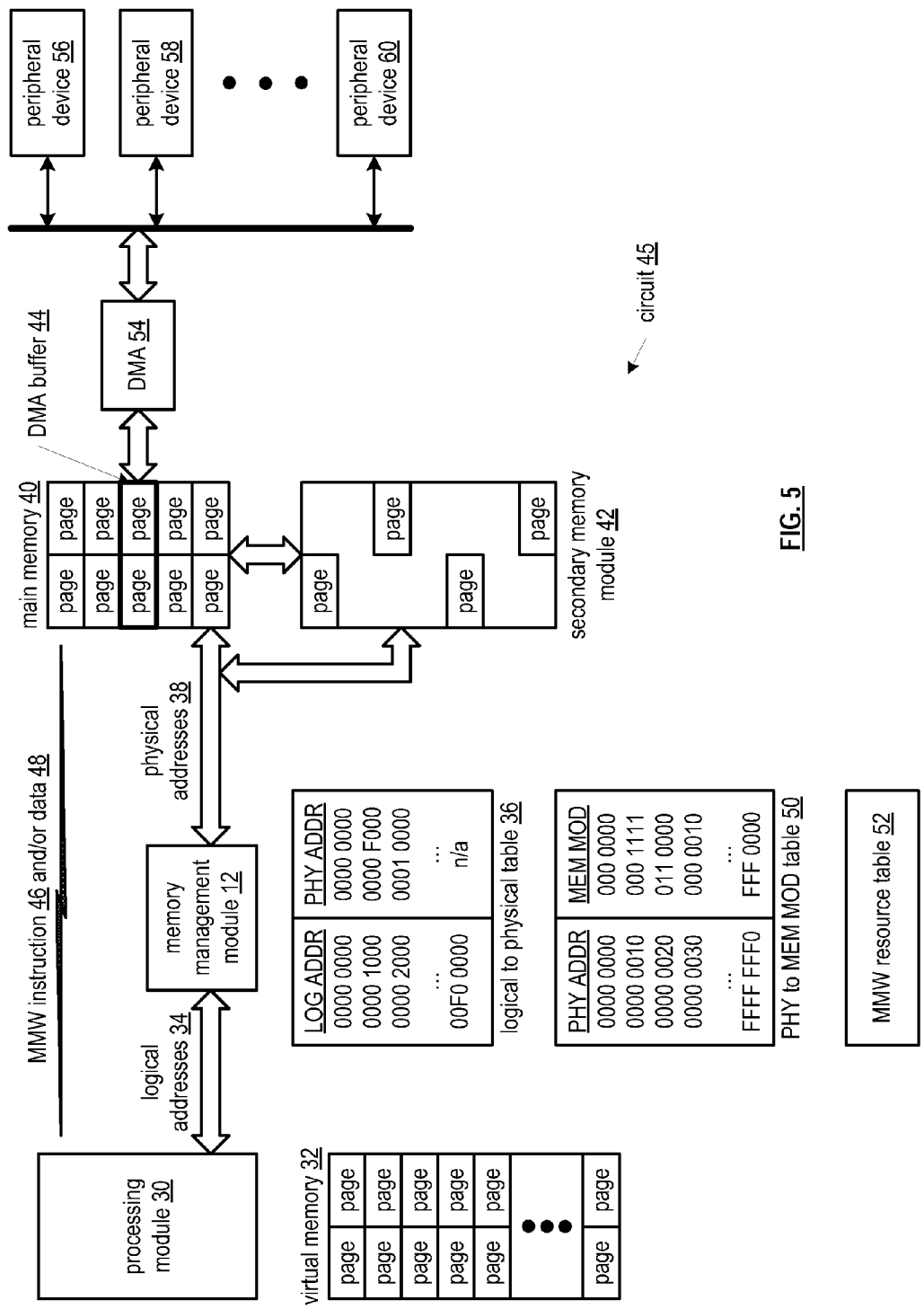
FIG. 5 is a schematic block diagram of an embodiment of a circuit in accordance with the present invention.

FIG. 5 is a schematic block diagram of an embodiment of a circuit 45 that includes the memory management module 12, a processing module 30, main memory 40, secondary memory 42, a direct memory access (DMA) module 54, and a plurality of peripheral devices 56-60. The peripheral devices 56-60 include one or more of a data input interface, a display interface, a video codec, a mobile industry processor interface (MIPI) interface, a USB interface, a graphics engine, a secure digital input/output (SDIO) interface, a hard disk/flash memory interface, an audio codec, a digital camera interface, an LCD interface, a SIM (Security Identification Module) card interface, a power management (PM) interface, a SD (Secure Digital) card or MMC (Multi Media Card) interface, a coprocessor interface, a Bluetooth (BT) transceiver interface, an FM tuner interface, a GPS receiver interface, a video sensor interface (e.g., a camcorder), a TV tuner interface, a universal subscriber identity module (USIM) interface, a second display interface, a Universal Asynchronous Receiver-Transmitter (UART) interface, a real time clock, and a general purpose I/O interface.

When the processing module 30 desires access to the main memory 40, it generates a memory access request (e.g., a read command, a write command, etc.) that includes a logical address 34. The logical address 34 corresponds to a memory location within a virtual memory 32, which includes a plurality of pages. Each page includes a plurality of addressable memory locations (e.g., 4K or more). The processing module 30 transmits the memory access request (which includes the logical address 34) via a wired or wireless communication path to the memory management module 12.

The memory management module 12 retrieves the logical address 34 from the memory access request and determines whether the logical address 34 is mapped to a physical address 38 in main memory 40. This may be done by accessing a logical address to physical address table 36, which includes a mapping of physical addresses of the main memory to logical addresses of the virtual memory 32. If the logical address is mapped to a physical address in the table 36, the memory management module 12 accesses a physical address to memory module table 50 to identify the memory module(s) 14 that is mapped to the identified physical address. The memory management module 12 then accesses a MMW wireless communication resource table 52 to identify the wireless communication resource(s) allocated to the identified memory module(s) and/or to identify an addressing wireless communication resource(s).

The memory management module 12 updates the memory access request to include the physical address 38 and provides the updated memory access request to the memory module(s) 14 of the main memory 40. This may be done via a wired connection or a wireless communication path (e.g., via an addressing wireless communication resource). The addressed memory module(s) 14 performs the memory access request. For example, if the request is a read request, the memory module(s) reads data (e.g., one or more lines of data, typically a page) from the corresponding memory lines and provides the read data to the processing module 30 via one or more of the allocated wireless communication resources. The read request may be for an instruction 46 and/or data 48.

If the logical address is not mapped to a physical address in the table 36, the memory management module 12 generates a swap message that is conveyed to the main memory 40 and the secondary memory module 42. In response to the swap message, the main memory 40 and the secondary memory swap data (i.e., the main memory sends a page of data (or instructions) to the secondary memory 42 and the secondary memory 42 sends a page of data (or instructions) including the desired data (or instruction) to the main memory 40). Once the desired data (or instruction) is stored in the main memory 40, it provides the data (or instruction) to the processing module 30 via one or more of the allocated wireless communication resources.

As is shown, the main memory 40 may include a DMA buffer 44 that is wirelessly accessible by the plurality of peripheral devices 56-60 via the DMA module 54. The DMA buffer 44 may be a contiguous buffer (i.e., a contiguous block of memory) or a scatter/gather buffer (i.e., buffer can be fragmented in the main memory and tracked via a mapping table).

Figure 6:
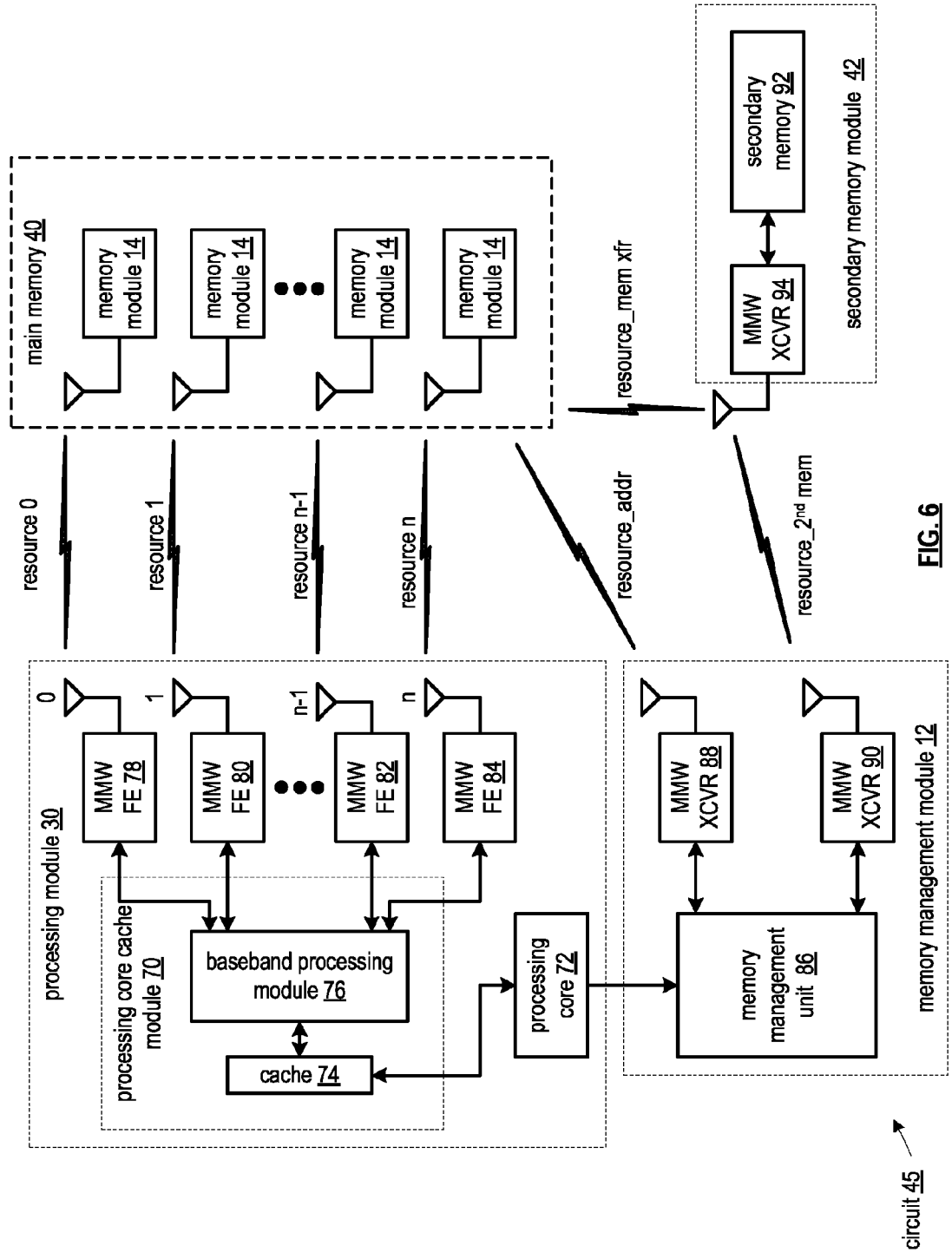
FIG. 6 is a schematic block diagram of another embodiment of a circuit in accordance with the present invention.

FIG. 6 is a schematic block diagram of another embodiment of a circuit 45 that includes the processing module 30, the memory management module 12, the secondary memory 42 and the main memory 40. The processing module 30 includes a processing core 72, a processing core cache module 70, and a plurality of millimeter wave (MMW) front-ends (FE) 78-84. The processing core cache module 70 includes one or more cache memories (e.g., a data cache and an instruction cache), and a baseband processing module 76. The memory management module 12 includes a memory management unit 86 and one or more MMW transceivers (XCVR) 88-90. The secondary memory module 42 includes secondary memory (e.g., a hard disk, flash memory, etc.) and a MMW transceiver 94. The main memory 40 includes the plurality of memory modules 14, which can be configured in a variety as ways as discussed with reference to FIGS. 3 and 4.

The processing core 72 may include one or more processing devices such as, but not limited to, a microprocessor, micro-controller, digital signal processor, microcomputer, central processing unit, field programmable gate array, programmable logic device, state machine, logic circuitry, analog circuitry, digital circuitry, and/or any device that manipulates signals [analog and/or digital] based on hard coding of the circuitry and/or operational instructions. When the processing core 72 desires access to the main memory 40, it generates a memory access request (e.g., a read command, a write command, etc.) that includes a logical address, which it provides to the memory management unit 86.

The memory management unit 86 determines whether the memory access request can be satisfied by the currently configured main memory 40 (i.e., the requested data and/or instruction is currently stored in main memory 40). If yes, the memory management unit 86 identifies the memory module(s) 14 within the main memory that satisfy the memory access request (e.g., is/are identified via the logical to physical address table 36 and the physical address to memory module table 50 or the logical address to memory module table). The MMW transceiver 88 converts the memory access request into a MMW signal and transmits it to the identified memory modules 14 via an address wireless communication resource (resource_addr).

The identified memory module(s) 14 recover the memory access request from the MMW signal and perform the request. For a read request, the memory module(s) reads data (e.g., one or more lines of data, typically a page) from the corresponding memory lines and converts it into a memory MMW signal, which is transmitted to the MMW front ends 78-84 of the processing module 30 via one or more wireless communication resources (resource 0 through resource n). For a write request, data and/or instructions stored in the cache 74 is converted to MMW signals and transmitted to the memory modules 14 via the MMW front-ends 78-84 and corresponding wireless communication resources.

If the memory access request cannot be satisfied by the currently configured main memory 40 (i.e., the requested data and/or instruction is not currently stored in main memory 40), the memory management unit 86 generates a swap message that is converted into one or more MMW signals by MMW transceiver 88 and/or 90. The swap MMW signal is transmitted to the secondary memory module 42 via a secondary memory wireless communication resource and the swap MMW signal is transmitted to the main memory 40 via the address wireless communication resource. The MMW transceiver 94 recovers the swap message and provides it to the second memory 92. The secondary memory 92 reads a page of data and provides it to the MMW transceiver 94. The MMW transceiver 94 converts the page of data into a MMW signal that is transmitted to the main memory via a memory transfer wireless communication resource (resource_mem xfr).

In response to the swap message, the main memory 40 retrieves and sends a page of data (or instructions) to the secondary memory 42 via the memory exchange wireless communication resource. The MMW transceiver 94 recovers the data and provides it to the secondary memory 92 for storage. Once the desired data (or instruction) is stored in the main memory 40, it provides the data (or instruction) to the processing module 30 via one or more of the allocated wireless communication resources.

FIG. 7 is a logic diagram of an embodiment of a method for accessing a configured main memory that may be performed by the memory management unit 86. The method begins at step 100 where the memory management unit 86 receives a memory access request (read, write, etc.) that includes a logical address. The request may be received from the processing via a wireless link or a wired link.

The method continues at step 102 where the memory management unit 86 accesses a physical address-to-logical address table to determine a physical address. As an example, the physical address-to-logical address table maps physical addresses of main memory to logical addresses of the virtual memory. The method continues at step 104, where the memory management module 86 accesses a memory module-to-physical address table to identify at least one memory module of the at least some of the plurality of memory modules based on the physical address. This mapping may be based on a line-by-line basis (e.g., a physical address maps to a row of one or more memory modules), based on the number of columns in a memory module; and/or on a page-by-page basis.

As an alternative to steps 102 and 104, the memory management unit 86 may use a logical address to memory module table to determine the identification of the one or more memory modules directly from the logical address. In this instance, the memory management unit 86 assigns memory modules directly to one or more logical addresses of the virtual memory and records the assignments in a table. As such, when a memory access request is received, which includes a logical address, the memory management unit 86 can readily identify one or more memory modules to address.

The method continues at step 106 where the memory management unit 86 determines at least one MMW communication resource for the at least one memory module in accordance with the MMW communication resource table. As an example, the MMW communication resource table may include an entry, or entries, for MMW wireless communication resources to use for addressing the one or more memory modules, entries for resources to be used for transceiving data and/or instructions between the memory modules and the processing module, and/or an entry, or entries, for resources to be used for transceiving data and/or instructions between the memory modules and the secondary memory module.

The method continues at step 108 wherein the memory management module 86 generates a memory module address message based on the memory access request and the identity of the at least one memory module. The memory module address message may include a field (or fields) for the memory module identification code, a field (or fields) for a local address within a memory module (e.g., one or more rows within the memory module), a field (or fields) for the allocated wireless communication resources, and/or a field (or fields) for at least a portion of the memory access request (e.g., read, write, swap, etc.).

FIG. 8 is a diagram of an example of the memory management module accessing a configured main memory. The example begins with the memory management module receiving at least one logical address that is associated with a virtual page of addresses 110. For instance, the virtual page 110 may have a logical address range of 0001 1000 to 0001 1FFF (hexadecimal) (e.g., a 4K word page) and the received logical address is within this range.

In one embodiment, the memory management module 12 accesses a logical address to memory module table to identify one or more memory modules of the main memory. The table is graphically represented 114 as a plurality of memory modules arranged in a particular configuration to comprise the main memory. In this example, a memory module 14 stores less than a full page of information (e.g., data and/or instructions). As such, the storage of the virtual page is spread among four memory modules 14. This may result because the number of cells of the memory modules is less than the page size (e.g., 1K word of memory cells vs. 4K word page size) or because only a portion of the memory cells of memory module are used for a given page and other memory cells are used for other pages.

In another embodiment, the memory management module 12 accesses a logical address to physical address table to map the logical address to a physical address and to correspondingly map the virtual page of addresses 110 to a main memory page of addresses 112. As shown, the logical addresses of 0001 1000 to 0001 1FFF is mapped to 00F1 1000 to 00F1 1FFF. The memory management module 12 then accesses a memory module to physical address table to identify one or more memory modules corresponding to the page of main memory. The table is graphically represented 114 as a plurality of memory modules arranged in a particular configuration to comprise the main memory.

Regardless of the embodiment to identify the memory modules, once the memory modules are identified, the memory management module 12 determines the MMW wireless communication resources to convey the memory access message to the memory modules, the resources for the memory modules to transceive data and/or instructions with the processing module, and/or resources for the memory module to transceive data with the secondary memory module. Once the resources are identified, the memory management module 12 generates a memory module address message 116 that is conveyed to the memory modules 14 via the allocated MMW wireless communication resource.

The memory module address message 116 may include a plurality of fields. For example, the message 116 may include one or more fields 118 for identifying the memory modules being addressed; one or more fields 120 for the allocated MMW wireless communication resources; and one or more fields 122 for the memory access message or a portion thereof. The message 116 may further include one or more fields 124 for a local address of the memory modules, which is used when a portion of the memory cells of the memory module are used for a given page and other memory cells are used for other pages. For example, when the memory module stores only one page, or a portion of a page, it can be addressed by its ID. However, when the memory modules stores, is capable of storing, or configured to storing more than just one page, or portion thereof, then the appropriate columns of the memory module need to be individually addressed, or addressed as local group.

Figure 9:
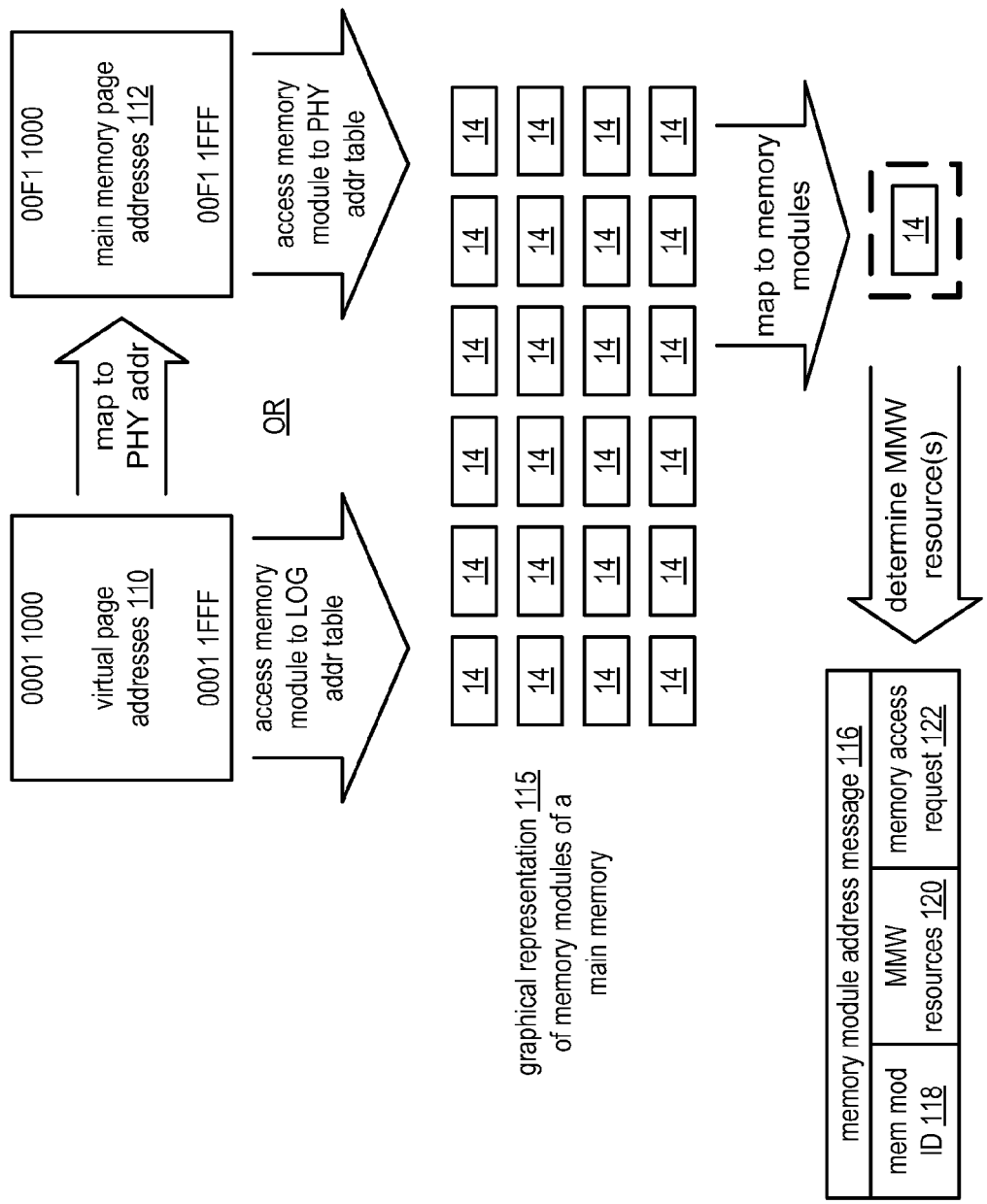
FIG. 9 is a diagram of another example of accessing a configured main memory in accordance with the present invention.

FIG. 9 is a diagram of another example of the memory management module accessing a configured main memory. The example begins with the memory management module receiving at least one logical address that is associated with a virtual page of addresses 110. For instance, the virtual page 110 may have a logical address range of 0001 1000 to 0001 1FFF (hexadecimal) (e.g., a 4K word page) and the received logical address is within this range.

In one embodiment, the memory management module 12 accesses a logical address to memory module table to identify one or more memory modules of the main memory. The table is graphically represented 114 as a plurality of memory modules arranged in a particular configuration to comprise the main memory. In this example, a memory module 14 stores a full page of information (e.g., data and/or instructions).

In another embodiment, the memory management module 12 accesses a logical address to physical address table to map the logical address to a physical address and to correspondingly map the virtual page of addresses 110 to a main memory page of addresses 112. As shown, the logical addresses of 0001 1000 to 0001 1FFF is mapped to 00F1 1000 to 00F1 1FFF. The memory management module 12 then accesses a memory module to physical address table to identify the memory modules corresponding to the page of main memory. The table is graphically represented 114 as a plurality of memory modules arranged in a particular configuration to comprise the main memory.

Regardless of the embodiment to identify the memory module, once the memory module is identified, the memory management module 12 determines the MMW wireless communication resources to convey the memory access message to the memory modules, the resources for the memory modules to transceive data and/or instructions with the processing module, and/or resources for the memory module to transceive data with the secondary memory module. Once the resources are identified, the memory management module 12 generates a memory module address message 116 that is conveyed to the memory modules 14 via the allocated MMW wireless communication resource.

The memory module address message 116 may include a plurality of fields. For example, the message 116 may include one or more fields 118 for identifying the memory modules being addressed; one or more fields 120 for the allocated MMW wireless communication resources; and one or more fields 122 for the memory access message or a portion thereof.

Figure 10:
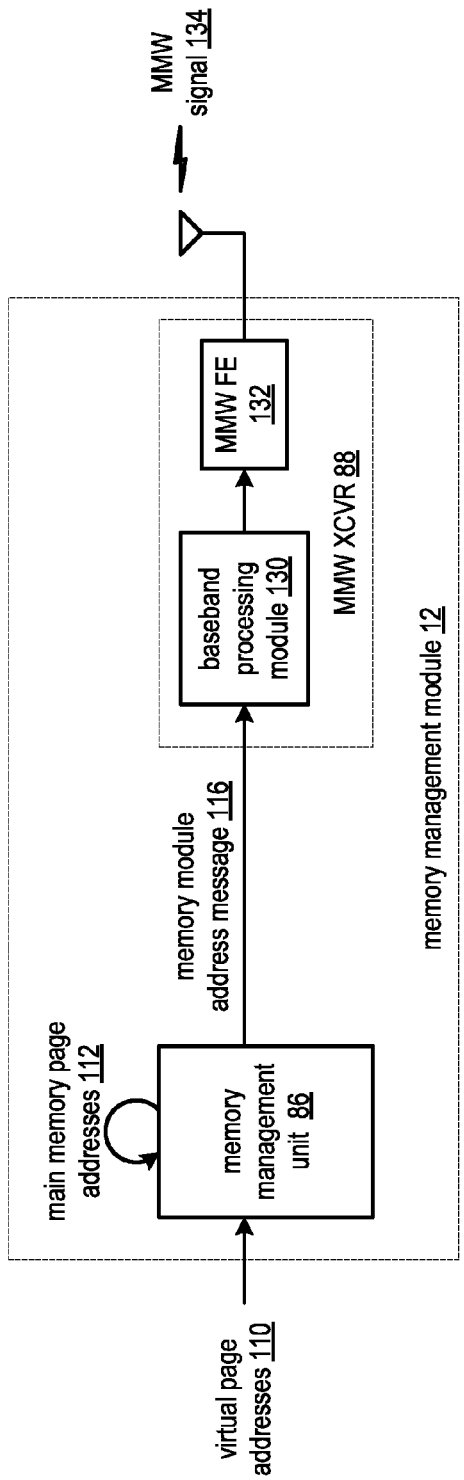
FIG. 10 is a schematic block diagram of an embodiment of a memory management module in accordance with the present invention.

FIG. 10 is a schematic block diagram of an embodiment of a memory management module 12 that includes the memory management unit 86 and the MMW transceiver 88. The MMW transceiver 88 includes a baseband processing module 130 and a MMW front-end (FE) 132. The MMW FE 132 includes a transmitter section and a receiver section, embodiments of which have been previously discussed. The memory management unit 86 and the baseband processing module 130 may be implemented via the same processing device or via separate processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing device may have an associated memory and/or memory element, which may be a single memory device, a plurality of memory devices, and/or embedded circuitry of the processing device. Such a memory device may be a read-only memory, random access memory, volatile memory, non-volatile memory, static memory, dynamic memory, flash memory, cache memory, and/or any device that stores digital information. Note that when the processing device implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry.

As previously discussed with reference to FIGS. 7-9, the memory management module 86 receives, or identifies, a virtual page of addresses 110, processes them to identify main memory page of addresses 112, and generates a memory module address message 116. The baseband processing module 130 converts the memory module address message 116 into an outbound address message symbol stream in a manner as previously discussed. The MMW FE 132 converts the outbound address message symbol stream into a MMW signal 134 in accordance with the at least one MMW communication resource (e.g., within the appropriate slot(s) and/or on the appropriate channel(s)). The MMW FE 132 then transmits the MMW signal 134 to the at least one memory module via the at least one MMW communication resource.

Figure 11:
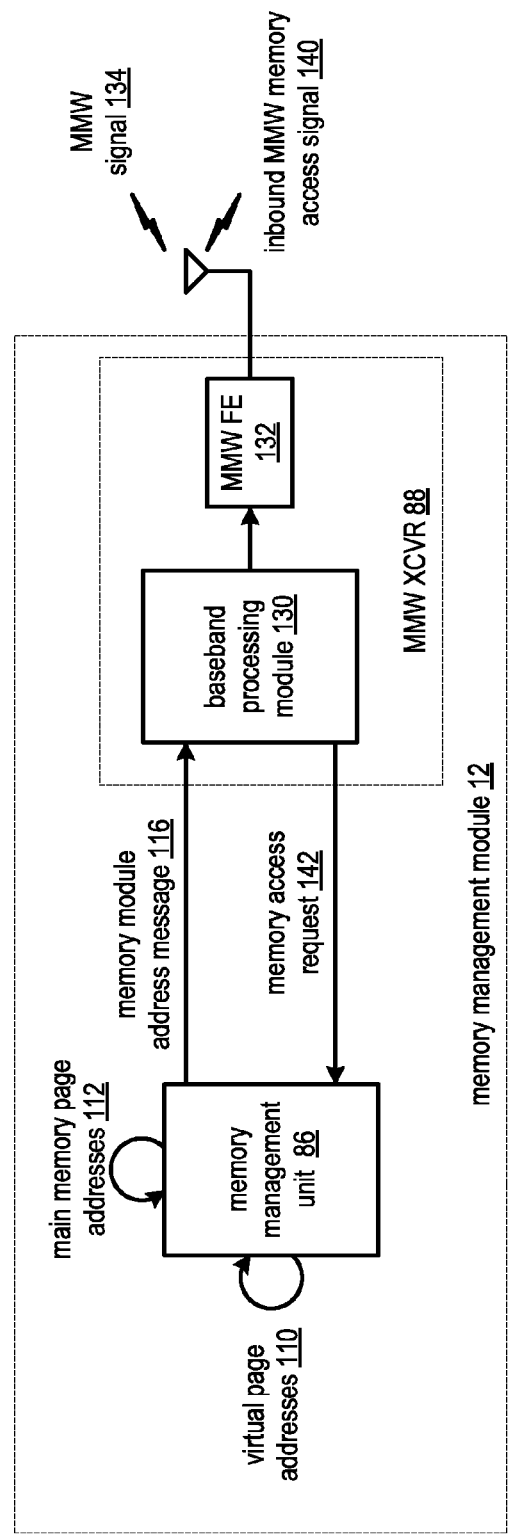
FIG. 11 is a schematic block diagram of an embodiment of a memory management module in accordance with the present invention.

FIG. 11 is a schematic block diagram of an embodiment of a memory management module 12 that includes the memory management unit 86 and the MMW transceiver 88. The MMW transceiver 88 includes a baseband processing module 130 and a MMW front-end (FE) 132. The memory management unit 86 and the MMW transceiver 88 function as previously described to generate the MMW signal 134.

In this embodiment, the MMW front-end (FE) 132 receives an inbound MMW memory access signal 140 from a processing module or other component. The MMW FE 132 converts the inbound MMW memory access signal 140 into an inbound memory access symbol stream and provides it to the baseband processing module 130. The baseband processing module 130 converts the inbound memory access symbol stream into the memory access request 142, which is conveyed to the memory management unit, which it processes as previously discussed.

Figure 12:
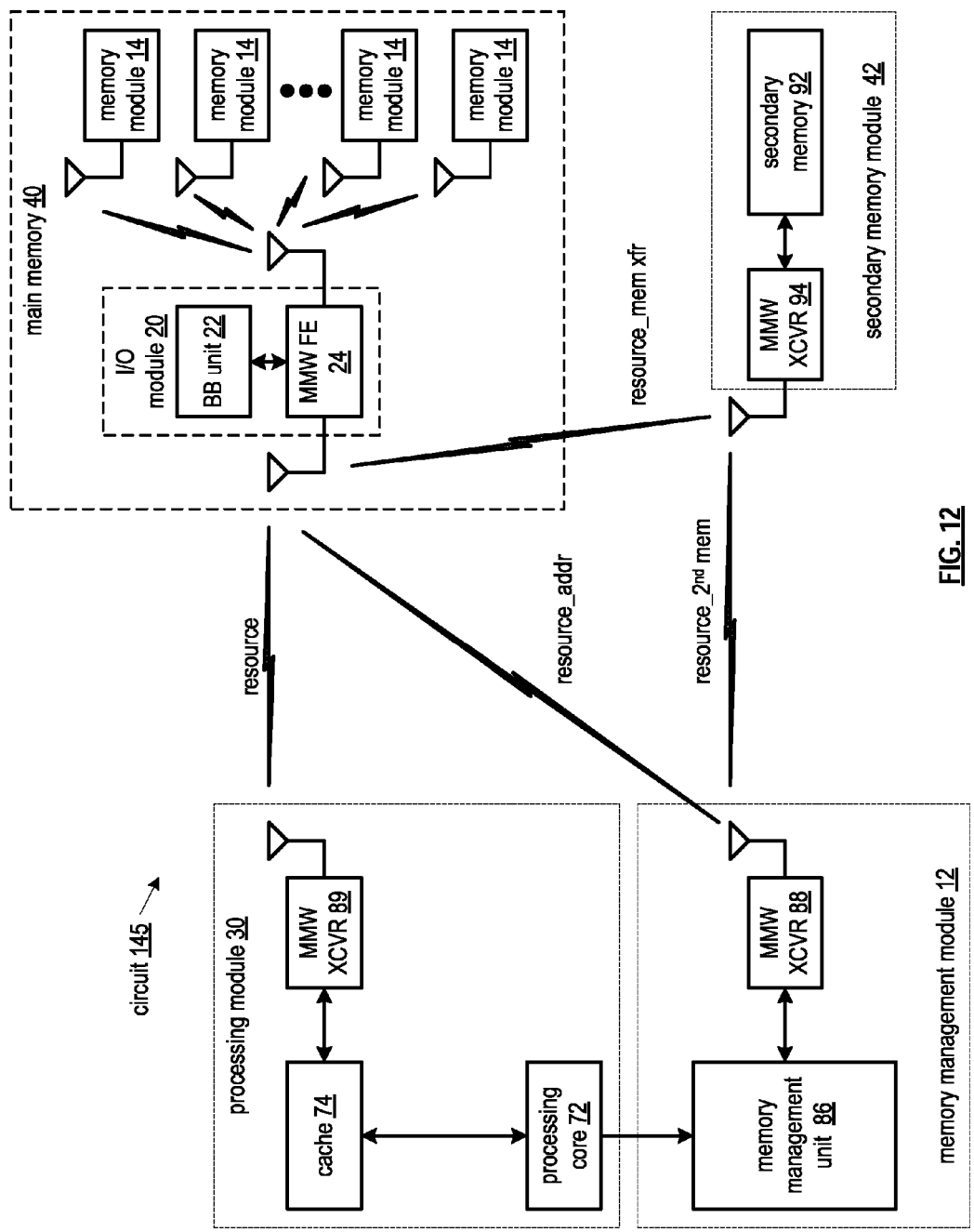
FIG. 12 is a schematic block diagram of another embodiment of a circuit in accordance with the present invention.

FIG. 12 is a schematic block diagram of another embodiment of a circuit 145 that includes the processing module 30, the memory management module 12, the secondary memory 42 and the main memory 40. The processing module 30 includes a processing core 72, a processing cache memory 74 (e.g., a data cache and/or an instruction cache), and a millimeter wave (MMW) transceiver 89. The memory management module 12 includes the memory management unit 86 and a MMW transceiver (XCVR) 88. The secondary memory module 42 includes secondary memory (e.g., a hard disk, flash memory, etc.) and a MMW transceiver 94. The main memory 40 includes the plurality of memory modules 14, which can be configured in a variety as ways as discussed with reference to FIGS. 3 and 4, and one or more I/O modules 20.

The processing core 72 may include one or more processing devices such as, but not limited to, a microprocessor, micro-controller, digital signal processor, microcomputer, central processing unit, field programmable gate array, programmable logic device, state machine, logic circuitry, analog circuitry, digital circuitry, and/or any device that manipulates signals [analog and/or digital] based on hard coding of the circuitry and/or operational instructions. When the processing core 72 desires access to the main memory 40, it generates a memory access request (e.g., a read command, a write command, etc.) that includes a logical address, which it provides to the memory management unit 86, which may be done via a wired connection or a wireless communication.

The memory management unit 86 determines whether the memory access request can be satisfied by the currently configured main memory 40 (i.e., the requested data and/or instruction is currently stored in main memory 40). If yes, the memory management unit 86 identifies the memory module(s) 14 within the main memory that satisfy the memory access request (e.g., is/are identified via the logical to physical address table 36 and the physical address to memory module table 50 or the logical address to memory module table). The MMW transceiver 88 converts the memory access request into a MMW signal and transmits it to the I/O module 20 via an address wireless communication resource (resource_addr).

The I/O module 20 may function as a repeater and provide the MMW signal to the identified memory module(s) 14 via communication resources within the memory device 10. Alternatively, the I/O module 20 may convert the MMW signal into an inbound symbol stream by the MMW FE 24. The baseband unit 22 processes the inbound symbol stream to produce an outbound symbol stream. The MMW FE 24 converts the outbound symbol stream into an intra-device MMW signal that is transmitted to the identified memory module(s) 14.

The identified memory module(s) 14 recover the memory access request from the intra-device MMW signal and perform the request. For a read request, the memory module(s) reads data (e.g., one or more lines of data, typically a page) from the corresponding memory lines and converts it into an intra-device memory MMW signal, which is transmitted to the MMW front end 24 of the I/O module 20 via one or more wireless communication resources. The I/O module 20 processes the intra-device memory MMW signal into a MMW signal that is transmitted to the MMW transceiver 89 of the processing module.

For a write request, data and/or instructions stored in the cache 74 is converted into a write MMW signal that is transmitted to the I/O module 20 via the MMW transceiver and corresponding inter-device wireless communication resources. The I/O module 20 processes the write MMW signal to produce an intra-device write MMW signal that it provides to the identified memory module(s) 14, which recovers and performs the corresponding write function.

If the memory access request cannot be satisfied by the currently configured main memory 40 (i.e., the requested data and/or instruction is not currently stored in main memory 40), the memory management unit 86 generates a swap message that is converted into one or more MMW signals by MMW transceiver 88. The swap MMW signal is transmitted to the secondary memory module 42 via a secondary memory wireless communication resource and the swap MMW signal is transmitted to the I/O module 20 of the main memory 40 via the address wireless communication resource. The MMW transceiver 94 recovers the swap message and provides it to the second memory 92. The secondary memory 92 reads a page of data and provides it to the MMW transceiver 94. The MMW transceiver 94 converts the page of data into a MMW signal that is transmitted to the main memory via a memory transfer wireless communication resource (resource_mem xfr).

In response to the swap message, the main memory 40, via the I/O module and the addressed memory modules, retrieves and sends a page of data (or instructions) to the secondary memory 42 via the memory exchange wireless communication resource. The MMW transceiver 94 recovers the data and provides it to the secondary memory 92 for storage. Once the desired data (or instruction) is stored in the main memory 40, it provides the data (or instruction) to the processing module 30 via one or more of the allocated wireless communication resources.

Figure 13:
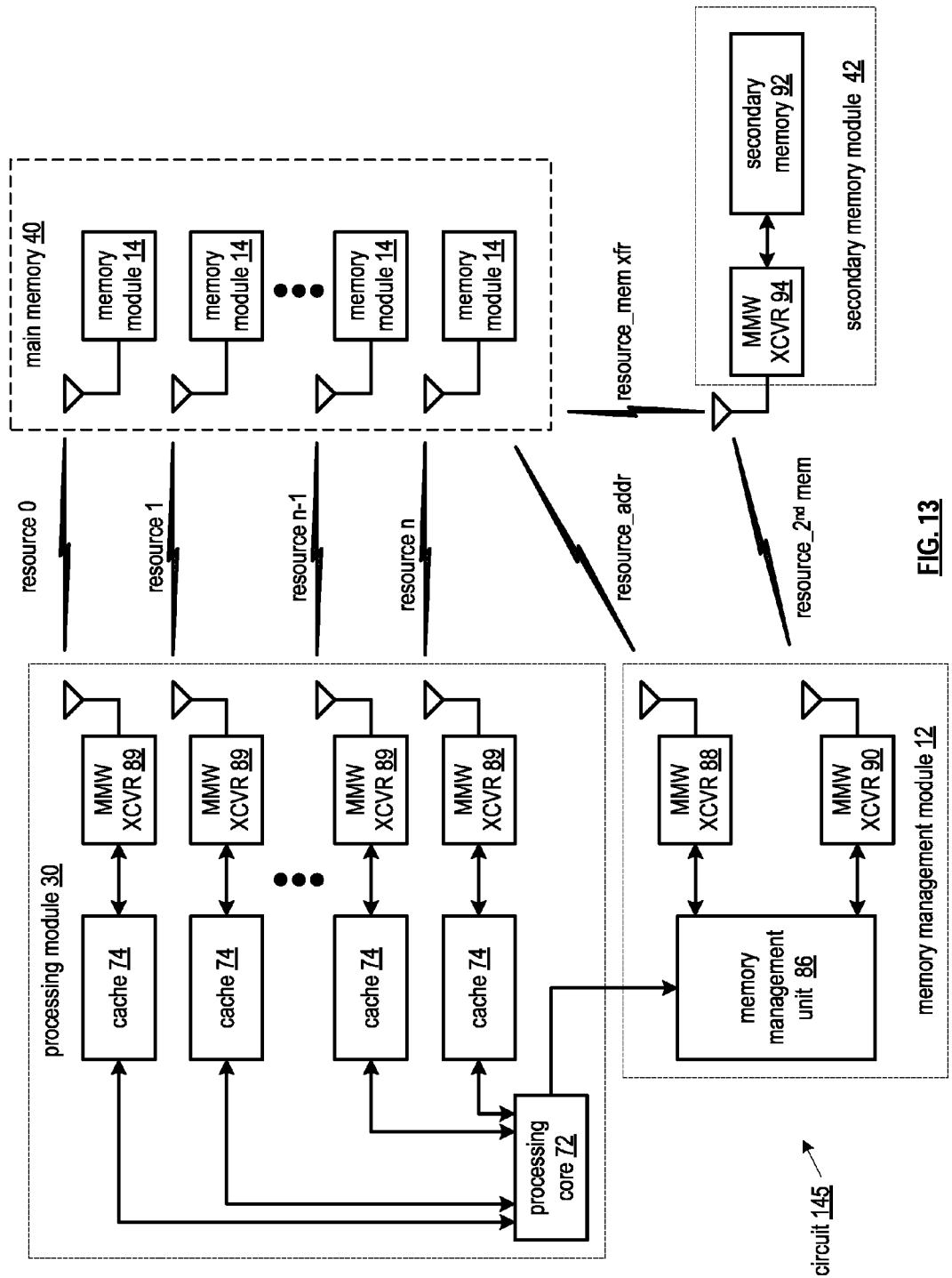
FIG. 13 is a schematic block diagram of another embodiment of a circuit in accordance with the present invention.

FIG. 13 is a schematic block diagram of another embodiment of a circuit 145 that includes the processing module 30, the memory management module 12, the secondary memory 42 and the main memory 40. The processing module 30 includes a processing core 72, a plurality of processing cache memory 74 (e.g., a data cache and/or an instruction cache), and a plurality of millimeter wave (MMW) transceivers 89. The memory management module 12 includes the memory management unit 86 and one or more MMW transceivers (XCVR) 88 & 90. The secondary memory module 42 includes secondary memory (e.g., a hard disk, flash memory, etc.) and a MMW transceiver 94. The main memory 40 includes the plurality of memory modules 14, which can be configured in a variety as ways as discussed with reference to FIGS. 3 and 4.

When the processing core 72 desires access to the main memory 40, it generates a memory access request (e.g., a read command, a write command, etc.) that includes a logical address, which it provides to the memory management unit 86, which may be done via a wired connection or a wireless communication. The memory management unit 86 determines whether the memory access request can be satisfied by the currently configured main memory 40 (i.e., the requested data and/or instruction is currently stored in main memory 40). If yes, the memory management unit 86 identifies the memory module(s) 14 within the main memory that satisfy the memory access request (e.g., is/are identified via the logical to physical address table 36 and the physical address to memory module table 50 or the logical address to memory module table). The MMW transceiver 88 converts the memory access request into a MMW signal and transmits it to the identified memory modules 14 via an address wireless communication resource (resource_addr).

The identified memory module(s) 14 recover the memory access request from the intra-device MMW signal and perform the request. For a read request, the memory module(s) reads data (e.g., one or more lines of data, typically a page) from the corresponding memory lines and converts it into a memory MMW signal, which is transmitted to the MMW transceiver 89 associated with one of the plurality of cache memories 74 via one or more wireless communication resources.

For a write request, data and/or instructions stored in the cache 74 is converted into a write MMW signal that is transmitted to the identified memory module (14) via the MMW transceiver 89 and allocated wireless communication resources. The identified memory module(s) 14 recovers and performs the corresponding write function.

If the memory access request cannot be satisfied by the currently configured main memory 40 (i.e., the requested data and/or instruction is not currently stored in main memory 40), the memory management unit 86 generates a swap message that is converted into one or more MMW signals by MMW transceiver 88 and/or 90. The swap MMW signal is transmitted to the secondary memory module 42 via a secondary memory wireless communication resource and the swap MMW signal is transmitted to the main memory 40 via the address wireless communication resource. The MMW transceiver 94 of the secondary memory module 42 recovers the swap message and provides it to the second memory 92. The secondary memory 92 reads a page of data and provides it to the MMW transceiver 94. The MMW transceiver 94 converts the page of data into a MMW signal that is transmitted to the main memory via a memory transfer wireless communication resource (resource_mem xfr).

In response to the swap message, the main memory 40, via the addressed memory modules, retrieves and sends a page of data (or instructions) to the secondary memory 42 via the memory exchange wireless communication resource. The MMW transceiver 94 recovers the data and provides it to the secondary memory 92 for storage. Once the desired data (or instruction) is stored in the main memory 40, it provides the data (or instruction) to the processing module 30 via one or more of the allocated wireless communication resources.

In this embodiment, a plurality of memory access requests may be processed concurrently. For example, each cache memory 74 may be concurrently active in a memory access request (e.g., read, write, swap, etc.) with negligible interference from the other cache memories' processing of their memory access requests. For example, if there are 32 MMW transceivers 89 in the processing module 30, then 32 different and concurrent memory access requests between the processing module 30 and the main memory 40 can be supported. In this instance, each memory access request may be processes as previously described with respect to a single memory access request.

Figure 14:
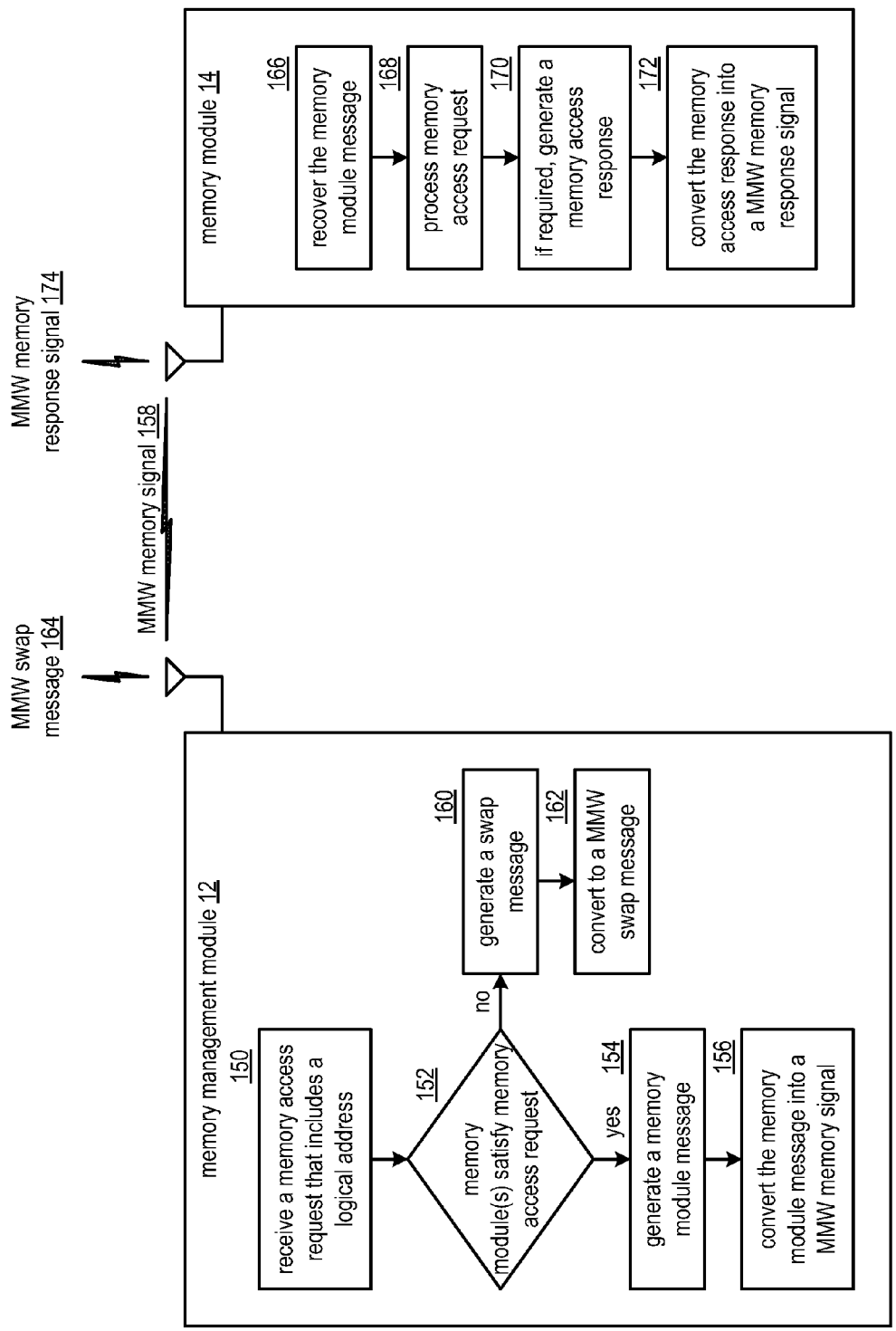
FIG. 14 is a schematic block diagram of an embodiment of a memory management module and a memory module in accordance with the present invention.

FIG. 14 is a schematic block diagram of an embodiment of a memory management module 12 wirelessly communicating with a memory module 14. Each module 12 and 14 performs a plurality of steps to wirelessly communicate with the other module, with the processing module 30, and/or with the secondary memory module 42. For instance, the memory management module 12 performs steps 150-162 and the memory module 14 performs steps 166-172.

Within the memory management module 12, at step 150, the module 12 receives a memory access request that includes a logical address, which has been previously discussed. The method continues at step 152 where the memory management module 12 determines whether one or more of the plurality of memory modules satisfies the memory access request based on the logical address and a table of logical address to memory modules. The table may include a mapping of logical addresses to memory module IDs or a first table that maps the logic address to a physical address and another table that maps the physical address to memory module IDs. Satisfying the request was previously discussed.

When the one or more of the plurality of memory modules does satisfy the memory access request, the method proceeds to step 154 where the memory management module 12 generates a memory module message identifying the one or more of the plurality of memory modules and at least a portion of the memory access request. This may be done in a variety of ways. For example, the memory management module 12 may interpret the memory access request to identify a page of memory based on the logical address. The memory management module 12 may then determine whether the page is stored in the one of the plurality of memory modules or in the one and at least one other memory module of the plurality of memory modules (i.e., is the page completely stored in one memory module or in more than one memory module).

When the page is stored in the one of the plurality of memory modules, the memory management module 12 determines whether at least part of another page is stored in the one of the plurality of memory modules (e.g., the page size is less than the size of the memory module or the memory module has been configured to store more than one page, or a portion thereof). When at least part of another page is not stored in the memory module, the memory management module generates the memory module message to include an identification code of the memory module. An example of this was provided with reference to FIG. 9. If, however, at least part of another page is stored in the memory module, the memory management unit 12 generates the memory module message to include the identification code of the one of the plurality of memory modules and a local address. An example of this was provided with reference to FIG. 8.

Another example of the memory management module 12 generating the memory module message begins with the module 12 determining that the page is stored in multiple memory modules and determining whether at least part of another page is stored in at least one of the multiple memory modules. When at least part of another page is not stored in one or more of the multiple memory modules (e.g., each memory module only stores, is capable of storing, or is configured to store one page, or a portion thereof), the memory management module 12 generates the memory module message to include an identification code of the each of the multiple memory modules.

When at least part of another page is stored in the one of the multiple memory modules, the memory management module 12 generates the memory module message to include the identification code of each of the multiple memory modules, a first corresponding local address for one of the multiple memory modules, and a second corresponding local address for a second one of the multiple memory modules.

Returning to step 156 of the method within the memory management module 12, the module 12 converts the memory module message into a millimeter wave (MMW) memory signal 158 in accordance with a memory module addressing communication resource. The memory management module 12 then transmits the MMW memory signal 158 to the one or more memory modules via the memory module addressing communication resource.

When the memory modules cannot satisfy the memory access request at step 152, the method continues at step 160 where the memory management module 12 generates a swap message. The method then continues at step 162 where the memory management module converts the swap message into a MMW swap message 164 that it subsequently transmits.

Within the identified memory modules 14 (which may be one or more modules, one is shown for convenience), the module 14 begins it method by receiving the MMW memory signal 158 via the memory module addressing communication resource. The method continues at step 166 where the memory module 14 recovers the memory module message from the MMW memory signal 158. The method continues at step 168 where the memory module 14 processes at least a portion of the memory access request. The method continues at step 170 where the memory module 14 generates a memory access response when required (e.g., a response to a read request). The method then continues at step 172 where the memory module 14 converts the memory access response into a MMW memory response signal 174 in accordance with a wireless communication resource. The memory module 14 transmits the MMW memory signal 174 to the processing module 30 or other device.

Figure 15:
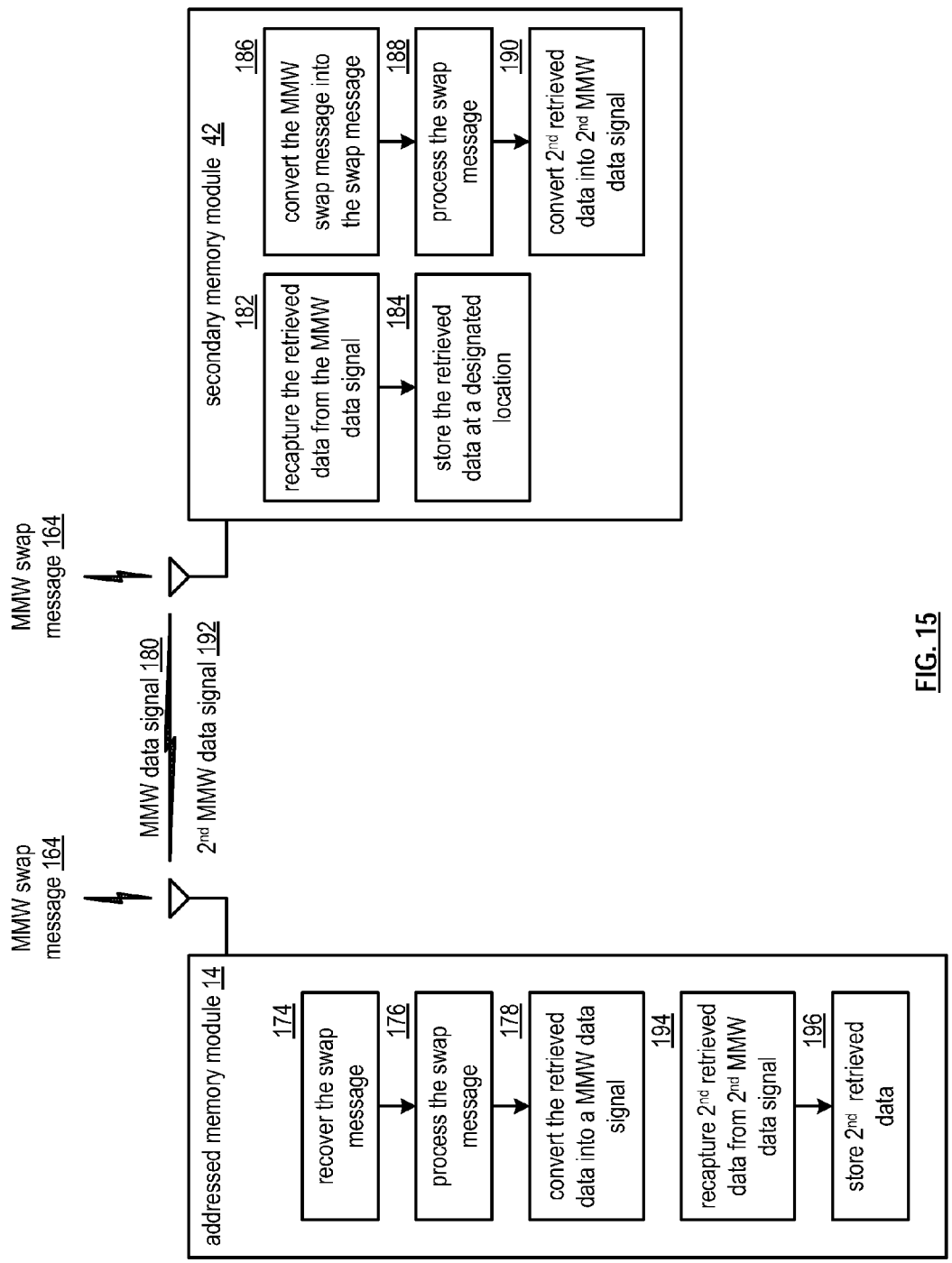
FIG. 15 is a schematic block diagram of another embodiment of a memory management module and a memory module in accordance with the present invention.

FIG. 15 is a schematic block diagram of an embodiment of a memory module 14 wirelessly communicating with a secondary memory module 42. Each module 14 and 42 performs a plurality of steps to wirelessly communicate with the other module, with the processing module 30, and/or with the memory management module 12. For instance, the memory module 14 performs steps 174-178 and 194-196 and the secondary memory module 42 performs steps 182-184 and 186-190.

Within the memory module 14, at step 174, the module 14 converts the MMW swap message 164 into the swap message. The method continues at step 176 where the module 14 processes the swap message to retrieve data stored therein (e.g., all data stored in the memory module or a portion thereof). The method continues at step 178 where the memory module 14 converts the retrieved data into a MMW data signal 180 and transmits it to the secondary memory module 42.

Within the secondary memory module 42 processing begins at step 182 where it receives the MMW data signal 180 and recaptures the retrieved data therefrom. The method continues at step 182 where the secondary memory module 42 stores the retrieved data at a designated location. In addition, the secondary memory module 42 converts, at step 186, the MMW swap message 164 into the swap message. The processing continues at step 188 where the secondary memory module 42 processes the swap message to retrieve second data stored within a second designated location to produce second retrieved data. The processing continues at step 190 where the secondary memory module 42 converts the second retrieved data into a second MMW data signal 192 and transmits it to the addressed one or more memory modules 14.

The method continues with the addressed one or more memory modules 14 at step 194 where the module 14 receives the second MMW data signal 192 and recaptures the second retrieved data therefrom. The method continues at step 196 where the memory module 14 stores the second retrieved data.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output(s), etc., to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A memory device comprises:
   a plurality of memory modules, wherein a memory module of the plurality of memory modules includes a plurality of memory cells and a memory millimeter wave (MMW) transceiver; and
   a memory management module coupled to:
       determine a main memory configuration for at least some of the plurality of memory modules;
       determine addresses of the main memory configuration; and
       determine a MMW communication resource table that includes an allocation mapping of one or more MMW communication resources to one or more of the at least some of the plurality of memory modules, wherein the memory management module comprises:
       a memory management unit operable to:
           receive a memory access request that includes a logical address;
           identify at least one memory module of the at least some of the plurality of memory modules based on the logical address;

determine at least one MMW communication resource for the at least one memory module in accordance with the MMW communication resource table; and generate a memory module address message based on the memory access request and the identity of the at least one memory module;

a memory MMW transceiver operable to:

convert the memory module address message into a MMW signal in accordance with the at least one MMW communication resource; and transmit the MMW signal to the at least one memory module via the at least one MMW communication resource.

2. The memory device of claim 1, wherein the memory management module further functions to determine the main memory configuration by at least one of:

accessing a pre-programmed default configuration;

accessing a look up table to determine the main memory configuration from one of a plurality of configurations; and determining memory addressability.

3. The memory device of claim 1, wherein the memory management module further functions to determine the main memory configuration by:

at start-up of a device including the memory device:

determine start-up applications requiring access to main memory;

allocate a portion of the plurality of memory modules for the start-up applications;

configure the portion of the plurality of memory modules in accordance with memory requirements of the start-up applications;

during on-going operation of the device including the memory device:

determine active applications requiring access to main memory, wherein the active applications includes at least some of the start-up applications;

allocate the plurality of memory modules for the active applications;

configure the plurality of memory modules in accordance with memory requirements of the active applications.

4. The memory device of claim 1, wherein the memory management module further functions to determine the main memory configuration by:

allocating a first portion of the plurality of memory modules for user applications;

allocating a second portion of the plurality of memory modules for operating system applications; and allocating a third portion of the plurality of memory modules for direct memory access.

5. The memory device of claim 1, wherein the memory management module further functions to determine the main memory configuration by:

determining memory line size; and determining the main memory configuration in accordance with the memory line size.

6. The memory device of claim 1 further comprises:

the memory management module receiving the memory access request from a processing core of a processing module.

7. The memory device of claim 1 further comprises:

the memory MMW transceiver operable to:

receive an inbound MMW memory access signal;

convert the inbound MMW memory access signal into the memory access request; and convey the memory access request to the memory management unit.

8. A memory device comprises:

a plurality of memory modules, wherein a memory module of the plurality of memory modules includes a plurality of memory cells and a memory millimeter wave (MMW) transceiver; and a memory management module coupled to:

receive a memory access request that includes a logical address;

determine whether one or more of the plurality of memory modules satisfies the memory access request based on the logical address and a table of logical address to memory modules;

when the one or more of the plurality of memory modules satisfies the memory access request, generate a memory module message identifying the one or more of the plurality of memory modules and at least a portion of the memory access request;

convert the memory module message into a millimeter wave (MMW) memory signal in accordance with a memory module addressing communication resource; and transmit the MMW memory signal to the one or more memory modules via the memory module addressing communication resource; wherein:

the one or more memory modules functions to:

receive the MMW memory signal via the memory module addressing communication resource;

recover the memory module message from the MMW memory signal;

process the at least a portion of the memory access request;

generate a memory access response when required;

convert the memory access response into a MMW memory response signal in accordance with a wireless communication resource; and transmit the MMW memory response signal via the wireless communication resource.

9. The memory device of claim 8, wherein the memory management module determining whether the one or more of the plurality of memory modules satisfies the memory access request further comprises:

determining whether a current entry in the table of logical address to memory modules exists for the logical address; and when the current entry in the table of logical address to memory modules exists for the logical address, determining that the one or more of the plurality of memory modules satisfies the memory access request.

10. The memory device of claim 9 further comprises the memory management module operable to:

when the current entry in the table of logical address to memory modules does not exist for the logical address, generate a swap message;

convert the swap message into a MMW swap message m accordance with a swap memory wireless communication resource;

transmit the MMW swap message via the swap memory wireless communication resource to the plurality of memory modules and to a secondary memory module.

11. The memory device of claim 10 further comprises:

an addressed one or more memory modules of the plurality of memory modules operable to:

convert the MMW swap message into the swap message;

process the swap message to retrieve data stored within the addressed one or more memory modules;
convert the retrieved data into a MMW data signal;
transmit the MMW data signal to the secondary memory module; and
the secondary memory module operable to:
receive the MMW data signal;
recapture the retrieved data from the MMW data signal; and
store the retrieved data at a designated location.

12. The memory device of claim 11 further comprises:
the secondary memory module operable to:
convert the MMW swap message into the swap message;
process the swap message to retrieve second data stored within a second designated location to produce second retrieved data;
convert the second retrieved data into a second MMW data signal;
transmit the second MMW data signal to the addressed one or more memory modules; and
the addressed one or more memory modules operable to:
receive the second MMW data signal;
recapture the second retrieved data from the second MMW data signal; and
store the second retrieved data.

13. The memory device of claim 8, wherein the memory management module generating the memory module message further comprises:
interpreting the memory access request to identify a page of memory based on the logical address;
determining whether the page is stored in the one of the plurality of memory modules or in the one and at least one other memory module of the plurality of memory modules;
when the page is stored in the one of the plurality of memory modules,
determining whether at least part of another page is stored in the one of the plurality of memory modules;
when the at least part of another page is not stored in the one of the plurality of memory modules, generating the memory module message to include an identification code of the one of the plurality of memory modules; and
when at least part of another page is stored in the one of the plurality of memory modules, generating the memory module message to include the identification code of the one of the plurality of memory modules and a local address.

14. The memory device of claim 13, wherein the memory management module generating the memory module message further comprises:
when the page is stored in the one and at least one other memory module of the plurality of memory modules, determine whether at least part of another page is stored in the one or the at least one other memory module of the plurality of memory modules;
when the at least part of another page is not stored in the one or the at least one other memory module of the plurality of memory modules, generate the memory module message to include an identification code of the one and of the at least one other memory module of the plurality of memory modules; and
when at least part of another page is stored in the one or the at least one other memory module of the plurality of memory modules, generate the memory module message to include the identification code of the one of the plurality of memory modules and a first corresponding local address and the identification code of the at least one other memory module of the plurality of memory modules and a second corresponding local address.

15. A circuit comprises:
a processing module that includes:
a processing core operable to produce a memory access request;
processing core cache coupled to the processing core; and
a millimeter wave (MMW) transceiver coupled to the processing core cache;
a configurable memory that includes a plurality of memory modules, wherein a memory module of the plurality of memory modules includes a plurality of memory cells and a memory MMW transceiver; and
a memory management unit operable to:
receive the memory access request;
interpret the memory access request to determine whether one or more of the plurality of memory modules satisfies the memory access request;
when the one or more of the plurality of memory modules satisfies the memory access request, generate a memory module message that includes identity of the one or more of the plurality of memory modules and at least a portion of the memory access request;
convert the memory module message into a MMW memory access signal; and
transmit the MMW memory access signal, wherein:
the one or more memory modules functions to:
receive the MMW memory access signal;
recover the memory module message from the MMW memory signal;
process the at least a portion of the memory access request.

16. The circuit of claim 15, wherein the one or more memory modules further functions to, when the memory access request is a read command:
generate a memory access response;
convert the memory access response into a MMW memory response signal; and
transmit the MMW memory response signal.

17. The circuit of claim 15, wherein the memory management module further functions to interpret the memory access request to determine whether one or more of the plurality of memory modules satisfies the memory access request by:
retrieving a logical address from the memory access request;
determining whether a current entry in a table of logical address to memory modules exists for the logical address; and
when the current entry in the table of logical address to memory modules exists for the logical address, determining that the one or more of the plurality of memory modules satisfies the memory access request.

18. The circuit of claim 17 further comprises the memory management module operable to:
when the current entry in the table of logical address to memory modules does not exist for the logical address, generate a swap message;
convert the swap message into a MMW swap message;
transmit the MMW swap message to the plurality of memory modules and to a secondary memory.

19. The circuit of claim 18 further comprises:
an addressed one or more memory modules of the plurality of memory modules operable to:
convert the MMW swap message into the swap message;

process the swap message to retrieve data stored within the addressed one or more memory modules;
convert the retrieved data into a MMW data signal;
transmit the MMW data signal to the secondary memory; and the secondary memory operable to:
receive the MMW data signal;
recapture the retrieved data from the MMW data signal; and
store the retrieved data at a designated location.

20. The circuit of claim 19 further comprises:
the secondary memory operable to:
convert the MMW swap message into the swap message;
process the swap message to retrieve second data stored within a second designated location to produce second retrieved data;
convert the second retrieved data into a second MMW data signal;
transmit the second MMW data signal to the addressed one or more memory modules; and the addressed one or more memory modules operable to:
receive the second MMW data signal;
recapture the second retrieved data from the second MMW data signal; and
store the second retrieved data.

21. The circuit of claim 15, wherein the memory management module generating the memory module message further comprises:
interpret the memory access request to identify a page of memory to retrieve based on a logical address;
determine whether the page is stored in the one of the plurality of memory modules or in the one and at least one other memory module of the plurality of memory modules;
when the page is stored in the one of the plurality of memory modules, determine whether at least part of another page is stored in the one of the plurality of memory modules;
when the at least part of another page is not stored in the one of the plurality of memory modules, generate the memory module message to include an identification code of the one of the plurality of memory modules; and
when at least part of another page is stored in the one of the plurality of memory modules, generate the memory module message to include the identification code of the one of the plurality of memory modules and a local address.

22. The circuit of claim 21, wherein the memory management module generating the memory module message further comprises:
when the page is stored in the one and at least one other memory module of the plurality of memory modules, determine whether at least part of another page is stored in the one or the at least one other memory module of the plurality of memory modules;
when the at least part of another page is not stored in the one or the at least one other memory module of the plurality of memory modules, generate the memory module message to include an identification code of the one and of the at least one other memory module of the plurality of memory modules; and
when at least part of another page is stored in the one or the at least one other memory module of the plurality of memory modules, generate the memory module message to include the identification code of the one of the plurality of memory modules and a first corresponding local address and the identification code of the at least one other memory module of the plurality of memory modules and a second corresponding local address.

* * * * *